United States Patent
Tamano et al.

[11] Patent Number: 5,930,799
[45] Date of Patent: Jul. 27, 1999

[54] DATABASE CREATING METHOD USING IMAGE INFORMATION

[75] Inventors: Maki Tamano, Toyonaka; Mitsuhiko Yoshimura, Settsu; Hiroyuki Okuda, Ikeda; Yoshiaki Yoshikawa, Ikoma; Noriyuki Murakami, Kyoto, all of Japan

[73] Assignee: Hitachi, Ltd., Tokyo, Japan

[21] Appl. No.: 08/843,859

[22] Filed: Apr. 17, 1997

[30] Foreign Application Priority Data

Apr. 19, 1996 [JP] Japan ................................. 8-097996

[51] Int. Cl.⁶ ........................................... G06F 13/00
[52] U.S. Cl. .................... 707/102; 707/501; 707/503; 707/506; 345/113; 345/127
[58] Field of Search .................... 707/506, 503, 707/501, 102; 345/127, 113

[56] References Cited

U.S. PATENT DOCUMENTS

| | | | |
|---|---|---|---|
| 4,939,689 | 7/1990 | Davis et al. | 707/102 |
| 5,367,619 | 11/1994 | Dipaolo et al. | 707/506 |
| 5,394,546 | 2/1995 | Hanatsuka | 707/4 |
| 5,412,774 | 5/1995 | Agrawal et al. | 345/340 |
| 5,513,348 | 4/1996 | Ryu et al. | 707/1 |
| 5,619,708 | 4/1997 | Ho | 707/506 |
| 5,625,771 | 4/1997 | Sakaguchi et al. | 707/501 |
| 5,752,253 | 5/1998 | Geymond et al. | 707/503 |

FOREIGN PATENT DOCUMENTS 6-149532  5/1994  Japan.

OTHER PUBLICATIONS

"Access Ver. 2.0 Part 3", Al Shuppan, 1995, pp. 38–46.

"Principle of Database System", The Computer Society of Japan, 1985, pp. 1–17.

"Turbo Pascal: Practice of Image Processing", Kogaku–sha, 1986, pp. 303–320.

"Microsoft Press Computer Dictionary", ASCII Shuppan–kyoku, p. 148.

Primary Examiner—Paul V. Kulik
Assistant Examiner—Jean R. Homere
Attorney, Agent, or Firm—Fay, Sharpe, Beall, Fagan, Minnich & McKee

[57] ABSTRACT

Representative item information concerning an item name represented on a form, parts control information for controlling a part or input/output area forming a display screen for inputting data to a database, and data attribute information including field name and data type referred to in defining a table in the database, are created for each item name beforehand. In accordance with an input from a user for image information of the form inputted beforehand, there is generated link information which includes positional information for distinguishing a position on the image information and sub referential information for distinguishing a field of the database. On the parts control information, a part is displayed on the image information displayed on a display device. A table of the database is defined on the basis of the data attribute information.

12 Claims, 20 Drawing Sheets

FIG. 4

Table 60 (4):

| REFER-ENTIAL ITEM ID (61) | ITEM ATTRIBUTE | | PARTS ATTRIBUTE | | | | DATA ATTRIBUTE | |
|---|---|---|---|---|---|---|---|---|
| | REPRE-SENTA-TIVE ITEM NAME (65) | TERM INTERPRE-TATION TABLE ID (62) | TYPE (66) | MIN. (67) | MAX. (68) | COMBO ITEM ID (63) / (69)(71) | FIELD NAME (72) | DATA TYPE (64) / (73) |
| 0 | WEIGHT | 1 | TEXT | 0 | 200 | NULL | WEIGHT | NUMBER(3,1) |
| 1 | NAME | 8 | TEXT | NULL | NULL | NULL | NAME | STRING(20) |
| 2 | SEX | 0 | COMB | 0 | 1 | 1 | SEX | NUMBER(1) |
| 3 | TEMPER-ATURE | ⋮ | ⋮ | ⋮ | ⋮ | ⋮ | ⋮ | ⋮ |
| 4 | | | | | | | | |

Table 70:

| COMBO ITEM ID (74) | ITEM NAME (75) | TERM INTERPRE-TATION TABLE ID (76) | NEXT COMBO ITEM ID (77) |
|---|---|---|---|
| 0 | SLIGHT | 3 | 2 |
| 1 | MALE | 2 | 3 |
| 2 | MEDIUM | 9 | 4 |
| 3 | FEMALE | 4 | END |
| 4 | SERIOUS | 7 | END |
| ⋮ | ⋮ | ⋮ | ⋮ |

Table 80:

| TERM INTERPRE-TATION TABLE ID (81) | ENGLISH REPRESEN-TATION (82) | JAPANESE REPRESEN-TATION (83) | NUMERIC REPRE-SENTA-TION (84) | SYMBOLIC REPRE-SENTA-TION (85) | ... |
|---|---|---|---|---|---|
| 0 | SEX | 性別 | NULL | NULL | ⋮ |
| 1 | WEIGHT | 体重 | NULL | NULL | |
| 2 | MALE | 男 | 0 | ♂ | |
| 3 | SLIGHT | 軽症 | 0 | NULL | |
| 4 | FEMALE | 女 | 1 | ♀ | |

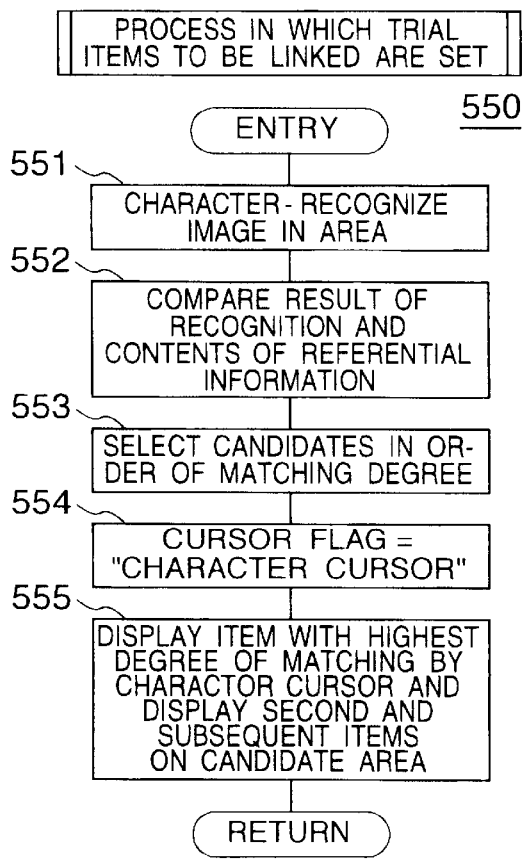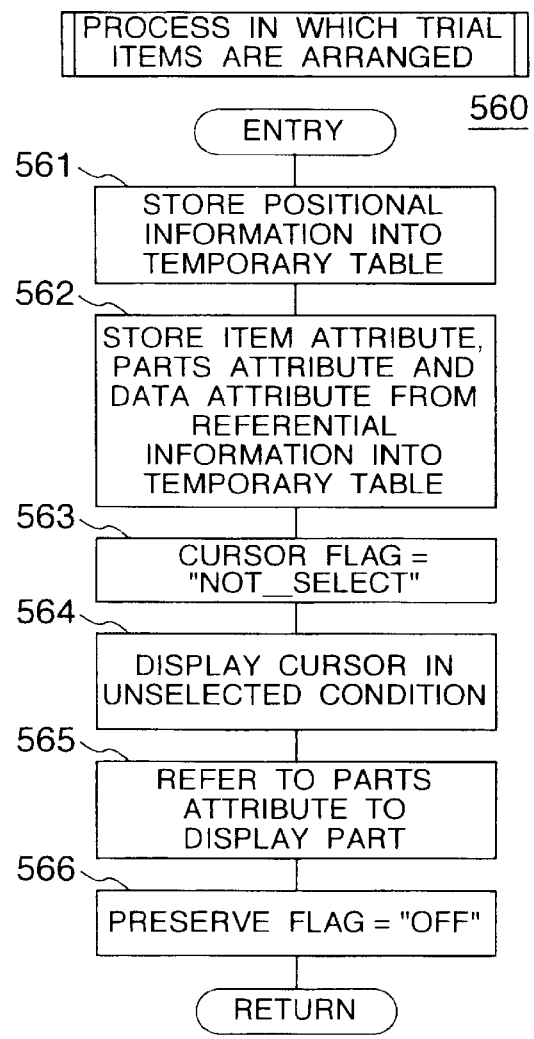

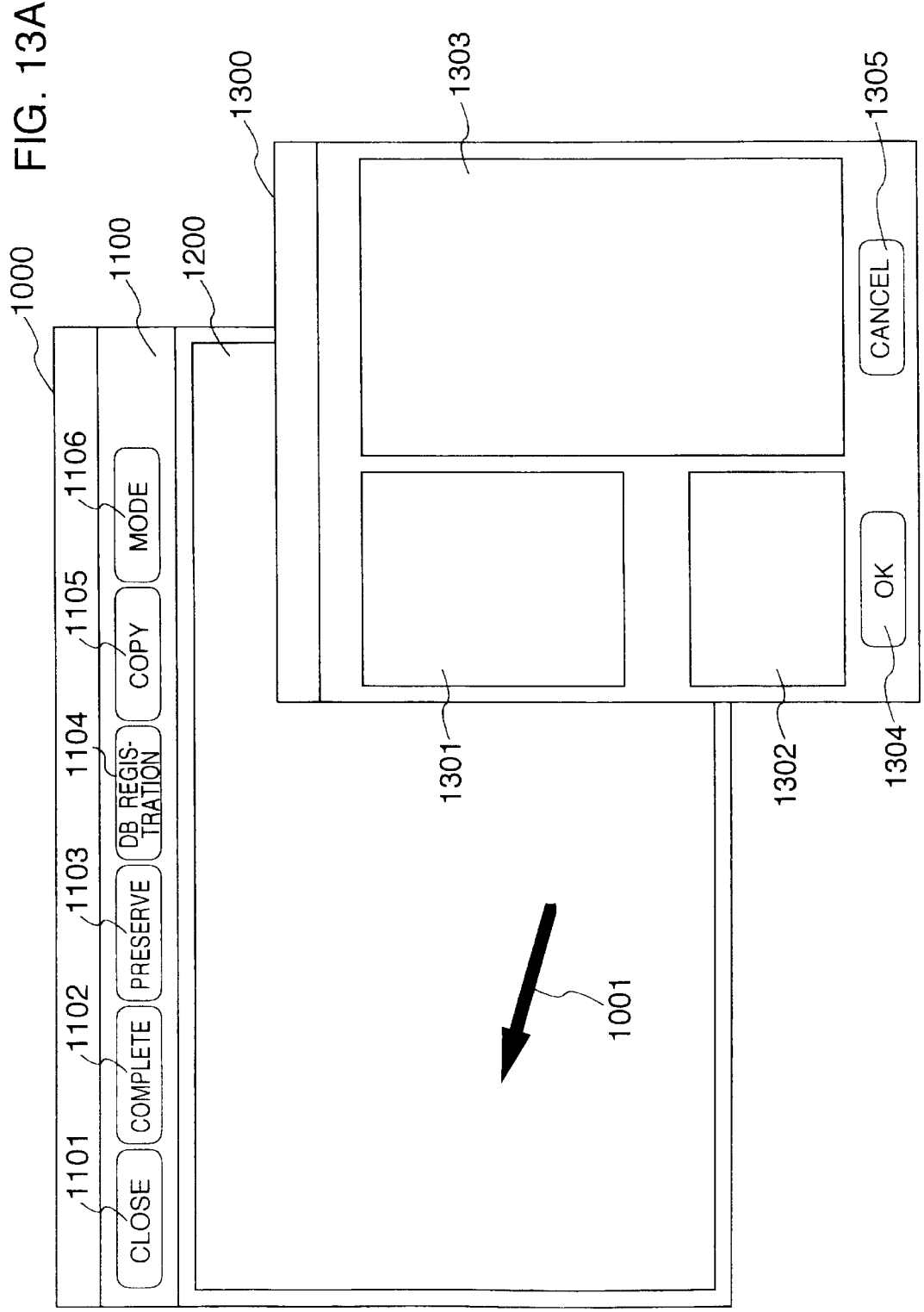

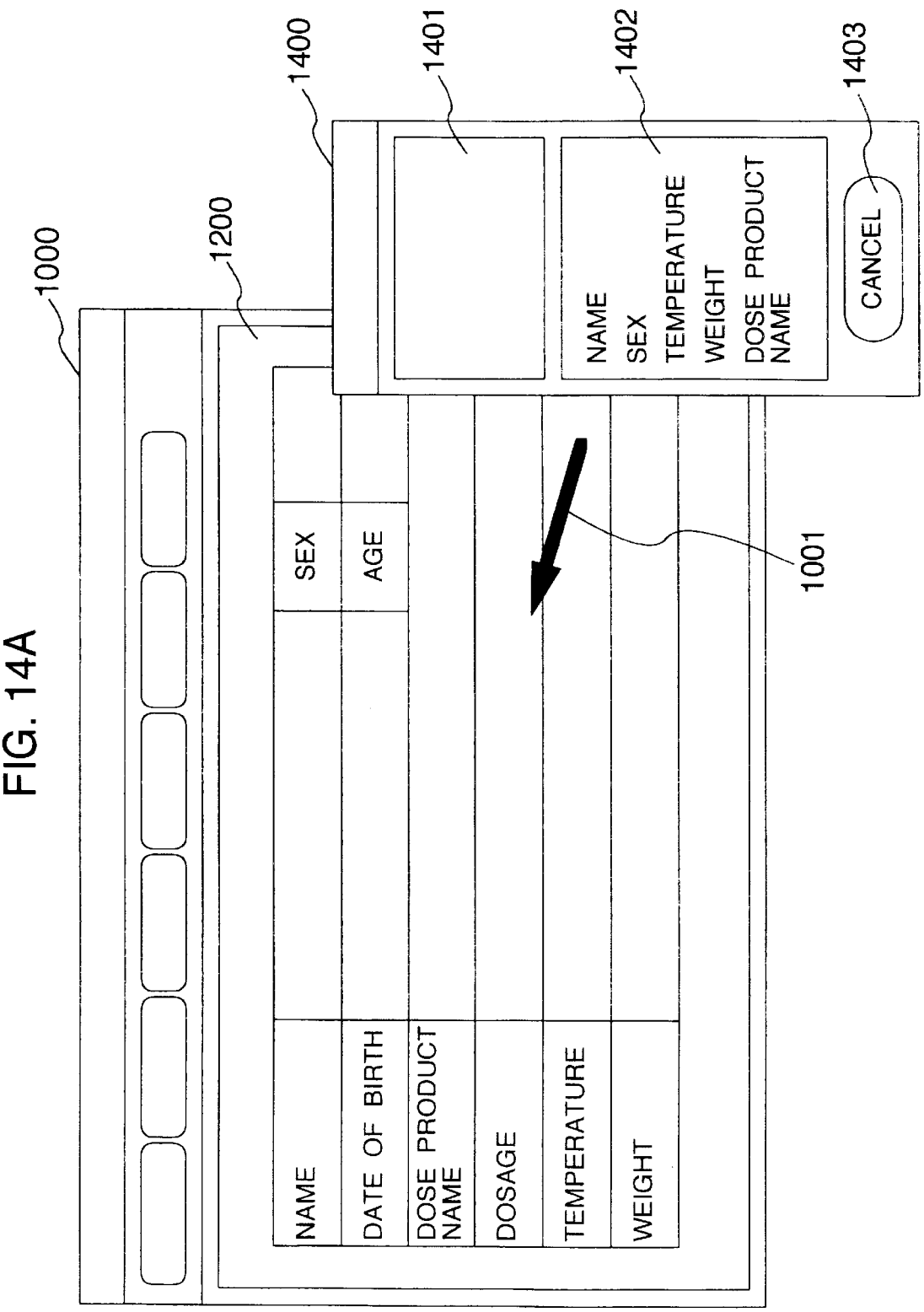

FIG. 15A

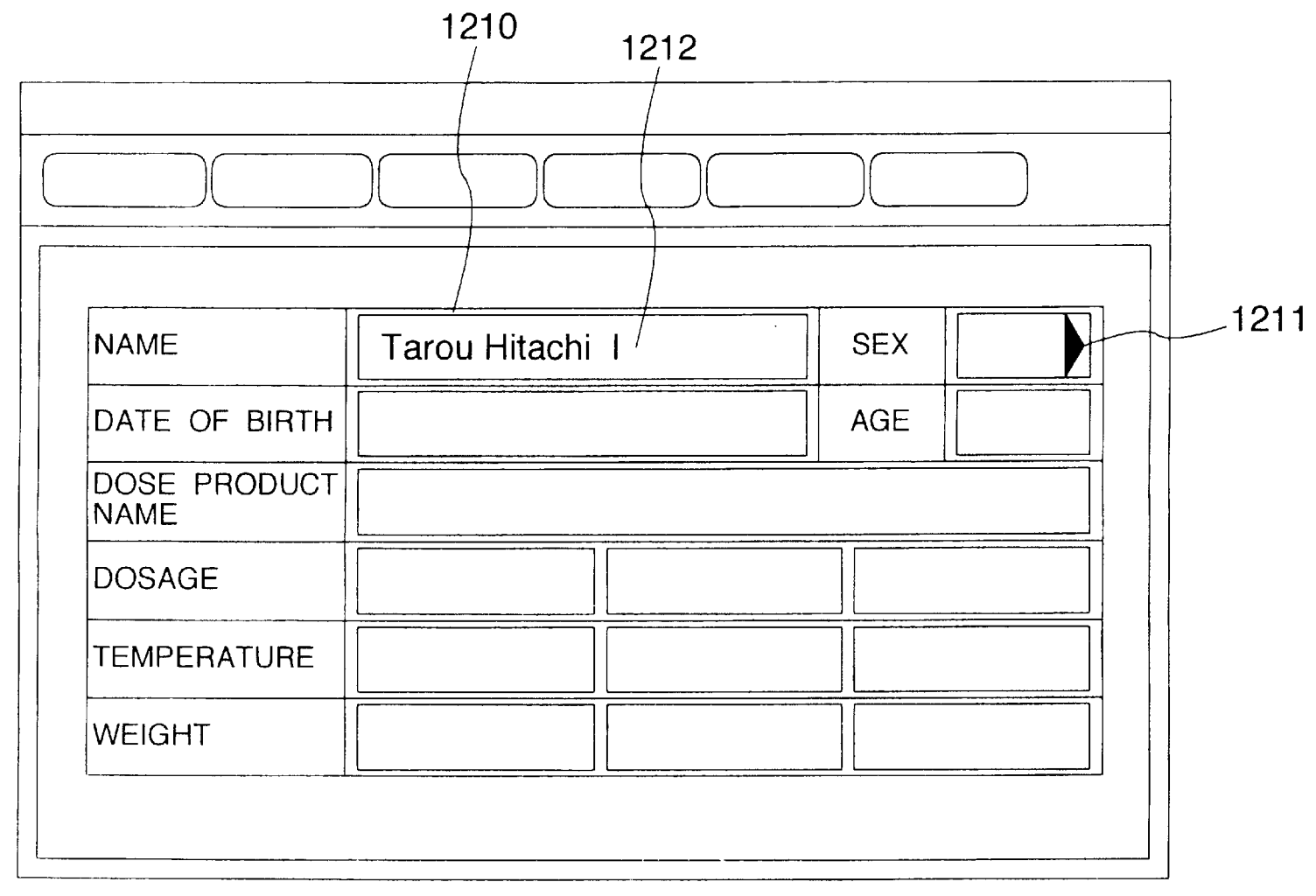

| NAME | Tarou Hitachi I | | SEX | ▲ | |
|---|---|---|---|---|---|
| DATE OF BIRTH | | | AGE | | |
| DOSE PRODUCT NAME | | | | | |
| DOSAGE | | | | | |
| TEMPERATURE | | | | | |
| WEIGHT | | | | | |

1211 (arrow marker)
1212 (name field)
1210 (row)

FIG. 15B

| NAME | Tarou Hitachi | | SEX | M·F | ~1202 |
|---|---|---|---|---|---|
| DATE OF BIRTH | 12/14/1948 | | AGE | 48 | |
| DOSE PRODUCT NAME | I | | | | ~1214 |
| DOSAGE | 300 mg | | | | |
| TEMPERATURE (°C) | 36.0 | 36.2 | 36.4 | 36.0 | ~1210 |
| WEIGHT (Kg) | 78.4 | 78.0 | 79.2 | 78.8 | ~1212 |

DATABASE CREATING METHOD USING IMAGE INFORMATION

BACKGROUND OF THE INVENTION

The present invention relates to a method for creating a database for electronic storage and management of contents recorded on a form (or application), a method for inputting data to the created database and a method for outputting the contents inputted to the created data base.

There is a database system as an information system for managing a large amount of information represented by values, characters and symbols. According to "PRINCIPLE OF DATABASE SYSTEM" published on 1985 by The Computer Society of Japan, the database system is structured and used on the basis of the following procedures:

(1) the definition of data structure, that is, so-called table definition in relational database;

(2) the input of data for each record of a table; and (3) the use of a table having the values of records inputted therein.

On the other hand, a method for defining a data structure or inputting data by use of a graphical user interface (hereinafter abbreviated to GUI) is provided in connection with recent database systems.

For example, a Microsoft Access disclosed by "Access Ver. 2.0 Part 3", pp. 38–46 published on 1995 by AI Shuppan provides a method in which a display screen for inputting data to a database having a predefined data structure is generated in such a manner that parts called controls are arranged on the display screen. This control is defined as being an object on the display screen which a user operates by use of a GUI in order to cause the object to perform some operation (see Microsoft Press Computer Dictionary page 148 published on July, 1993 by ASCII Shuppan-kyoku). One of such controls includes a part representing an input/output area on which characters inputted by use of a keyboard can be displayed.

Also, in the case where a link is set by designating a position on a display screen by use of a cursor, a "Cursor Shape Setting Method" disclosed by JP-A-6-149532 exists as a technique of providing a cursor capable of surely designating a location where the link is to be set. This reference has disclosed a method in which the shape of a cursor is set in creating a correspondence between a map and a data entry included in a file.

A medical supplies company entrusts an investigator of a medical institution for the trial of newly developed and sale-expected investigative products for human beings. The entrusted investigator doses trial subjects with the investigative products to measure data of each trial subject in accordance with trial items. This is called a clinical trial. The result of the clinical trial is recorded on a recording form called case report form (hereinafter abbreviated to CRF). The trial items are prescribed for each investigative product which is the object of a trial. Information concerning the prescribed trial items is recorded on the CRF. The CRF has a printed form or an optically or electronically recorded form. In the following, the printed CRF will be called a CRF blank. Generally, the CRF blank is composed of a plurality of sheets for one investigative product. Namely, the CRF blank has trial items prescribed for each of several investigative products and several case records for each trial item are entered in the CRF blank.

On the basis of the CRF having case records entered therein, the medical supplies company summarizes the results of clinical trials by use of a database system so that the effectiveness of the investigative product is judged by use of the result of totalized data subjected to statistical processing, or the like. A database structured at this time (that is, a database having case records stored therein) is called a case record database. The case record database is structured in accordance with the following procedures.

(1) Trial items are prescribed for each investigative product and standard items are created depending upon the type of that investigative product. But, the contents or combination of items to be estimated differ for every investigative product.

(2) A CRF blank is created on the basis of the prescribed trial items.

(3) A table for inputting data recorded on the CRF blank is defined corresponding to a case record database. Namely, one (CRF) table is defined, for one kind of CRF, in the case record database.

(4) On the basis of the generated CRF table, there is generated a display screen for inputting the data recorded on the CRF blank to the case record database.

(5) The CRF blank created in the procedure (2) is distributed to an investigator who is a doctor. The result of the clinical trial is entered in the CRF blank. In the CRF blank is entered data (name, bodily temperature, blood pressure and so forth) in units of one trial subject. It is specified by the law that the doctor himself or herself makes an entry in the CRF blank and stamps the CRF with an approval seal.

(6) Data recorded on the filled CRF blank collected by the medical supplies company is inputted to the case record database by use of the display screen generated in the procedure (4). Data recorded on the same kind of CRF blank is inputted to the same CRF table.

(7) The case record database having the results of the clinical trial inputted thereto in the procedure (6) is searched (or referred to) for data of individual trial subjects in order to judge the effectiveness or the like of the investigative product.

Though the above-mentioned prior art has described the generation of a display screen for inputting data to a database for which a data structure is predefined, this prior art is silent for the generation of a display screen for inputting data to a database for which a data structure has not yet been defined. Therefore, the following problems arise in the case where a case record database is to be newly structured.

In the above-mentioned prior art, the input display screen is generated on the basis of a field name of the database. Therefore, it is necessary to designate a field name of the database when the display screen for the input of data to the database is to be generated. Accordingly, a work for distinguishing unnecessary field names in order to input data recorded on a form is required, thereby deteriorating the working efficiency of a case record database creating work.

Also, since a positional relationship in a form between cells filled with data to be inputted to the database is different from that on the input display screen between input areas for inputting the data, the working efficiency of an inputting work is deteriorated.

Further, the above-mentioned prior art is silent for a database creating method suitable in creating another case record database concerning a CRF including trial items similar to those in a CRF for which a case record database has already been created and is also silent for a method of managing standardized trial items. Therefore, the working efficiency of the case record database creating work is deteriorated, thereby increasing the time required for creating the case record database.

Furthermore, the above-mentioned prior art has referred to a function of changing an input display screen for inputting a predefined data structure, but is silent for a function of changing the data structure in accordance with the change of the input display screen. Therefore, the working efficiency of the case record database creating work is deteriorated, thereby increasing the time required for creating the case record database.

SUMMARY OF THE INVENTION

An object of the present invention is to provide a database creating method in which the data structure of a database can be defined even if information concerning the data structure of the database is not inputted.

Another object of the present invention is to provide a method for inputting the recorded contents of a free formatted application to a database, the free formatted application having no regulation concerning the format and the number of characters entered in each cell in the case where characters are entered in the application or form.

A further object of the present invention is to provide a database creating method in which a display screen for inputting data to a database can be generated even if the data structure of the database is predefined.

A still further object of the present invention is to provide a database creating method suitable for the reuse of information which defines a standardized data structure for a database.

A further object of the present invention is to provide a database inputting method suitable for the input of entry data in a form to a database.

According to the present invention, the above objects are attained by a method comprising the following steps.

(1) Referential information is prepared beforehand for each of item name represented on a CRF (Case Report Form). The referential information includes an item attribute concerning the item name, a parts attribute for controlling a part which is an input/output area forming a display screen for inputting data to a database, and a data attribute such as field name and data type to which the reference is made when a table is defined in the database. (2) On the basis of an input from a user for image information of CRF inputted beforehand, there is generated link information which includes positional information for uniquely distinguishing a displaying position of a part on the image information and sub referential information prepared on the basis of the referential information for uniquely distinguishing a field of the database. (3) On the basis of the parts attribute, the item attribute and the positional information, parts are displayed on the image information displayed on a display device. (4) A table is defined in the database on the basis of the data attribute included in the link information.

(5) Further, a display screen for input to the database is displayed on the basis of the previously inputted CRF image information and the link information. (6) On the basis of the parts attribute and the data attribute, data inputted from the input display screen is stored into the database table defined in the above step (4).

BRIEF DESCRIPTION OF THE DRAWINGS

FIG. 4 shows the chart of table contents of each table forming referential information 4;

FIGS. 11A, 11B and 11C and FIG. 12 show the flow charts of subroutines in the process for input to the image area;

FIG. 13A shows a displayed example of an application program display screen in an embodiment of the present invention;

FIGS. 14A and 14B show examples of a display screen in the case where a database defining process is performed; and FIGS. 15A and 15B show examples of the display screen in the case where a database inputting process is performed.

DESCRIPTION OF THE PREFERRED EMBODIMENTS

The detailed explanation of an embodiment of the present invention using the accompanying drawings will now be made by way of example in conjunction with the case where there is created a case record database or a database in which the result of a clinical trial entered in a CRF (Case Report Form) blank is stored.

Figure 1:
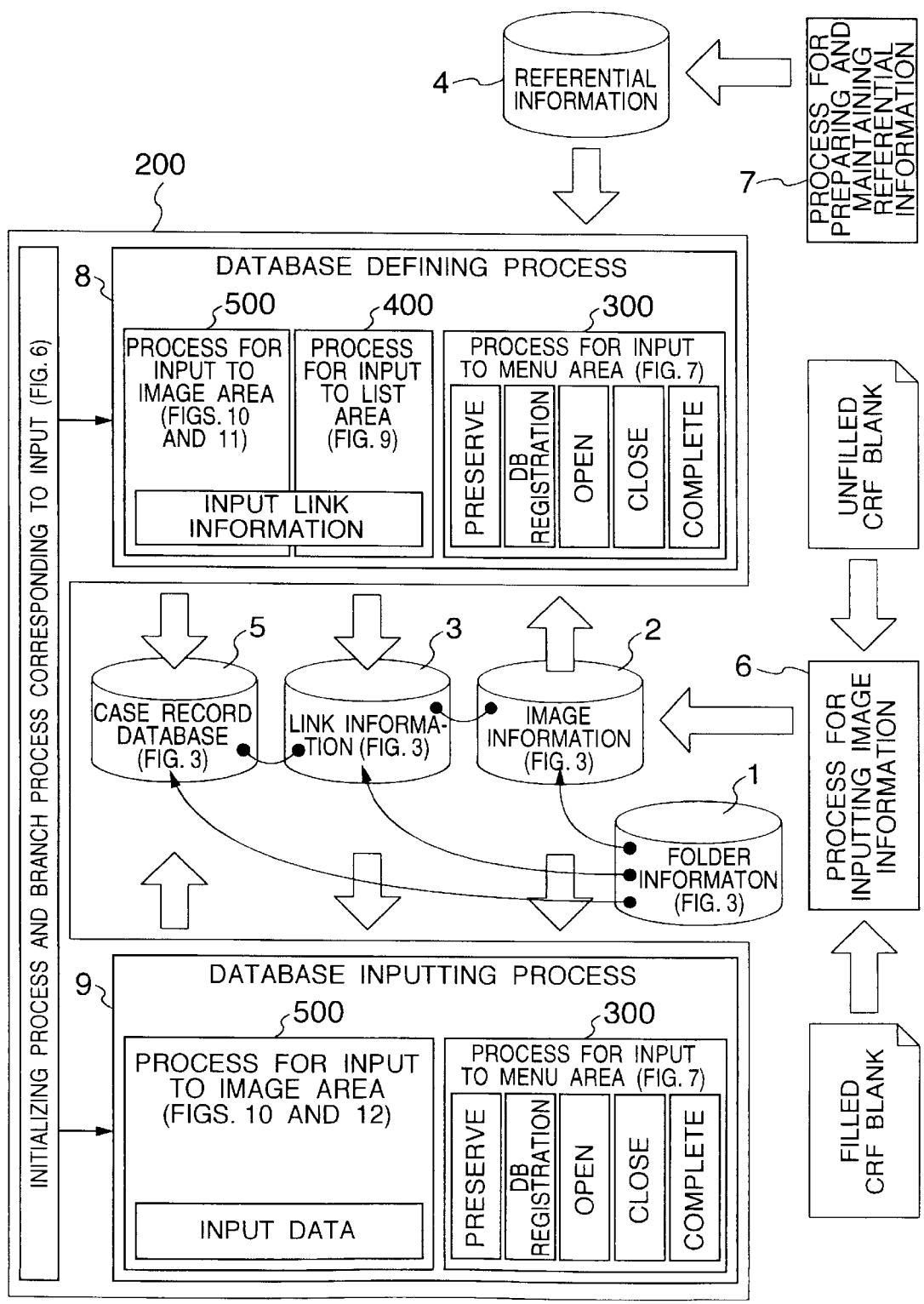
FIG. 1 is a conceptual diagram showing a relationship between processes in an embodiment of the present invention.
Figure 2:
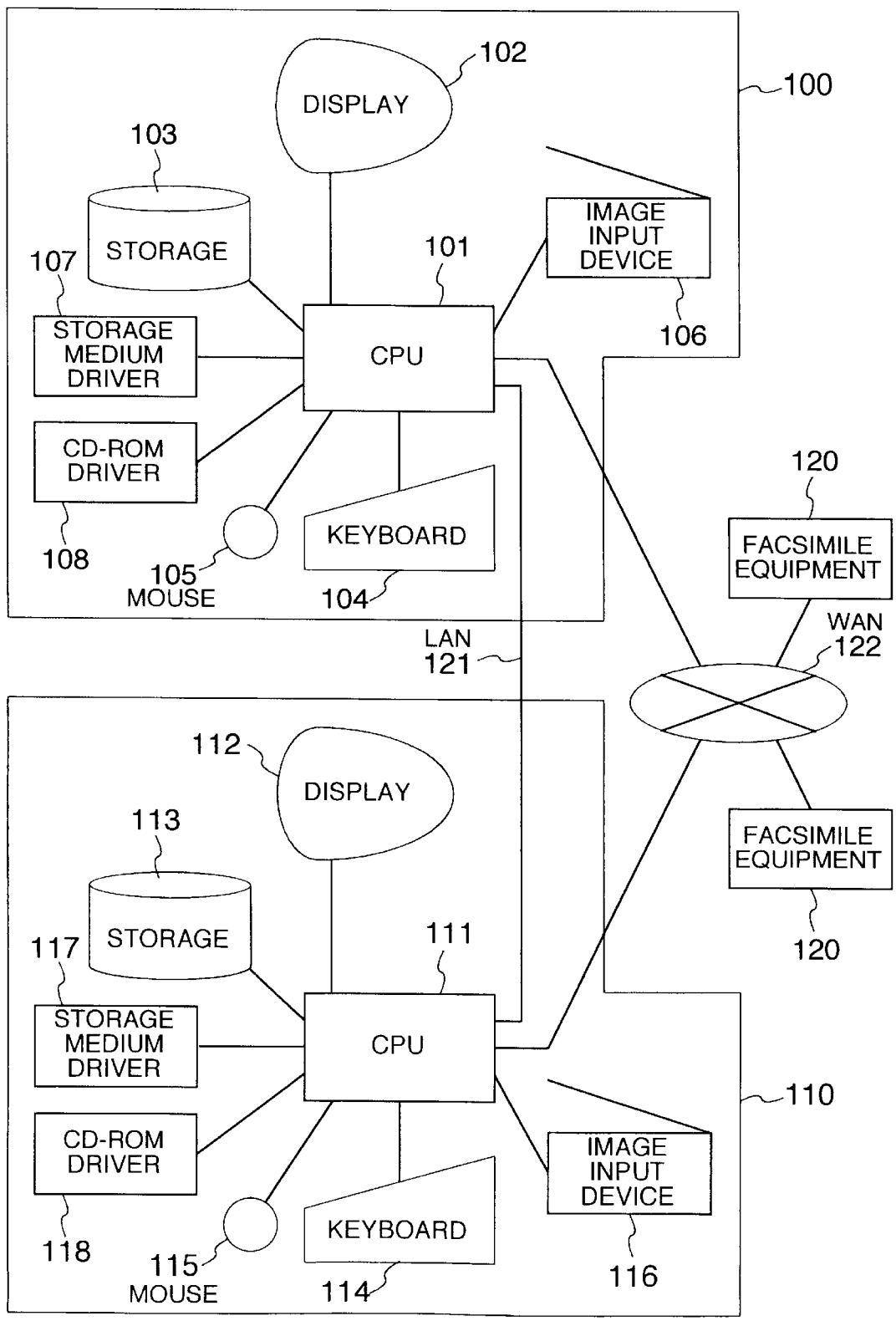
FIG. 2 is a diagram showing the construction of a system according to an embodiment of the present invention.
Figure 3:
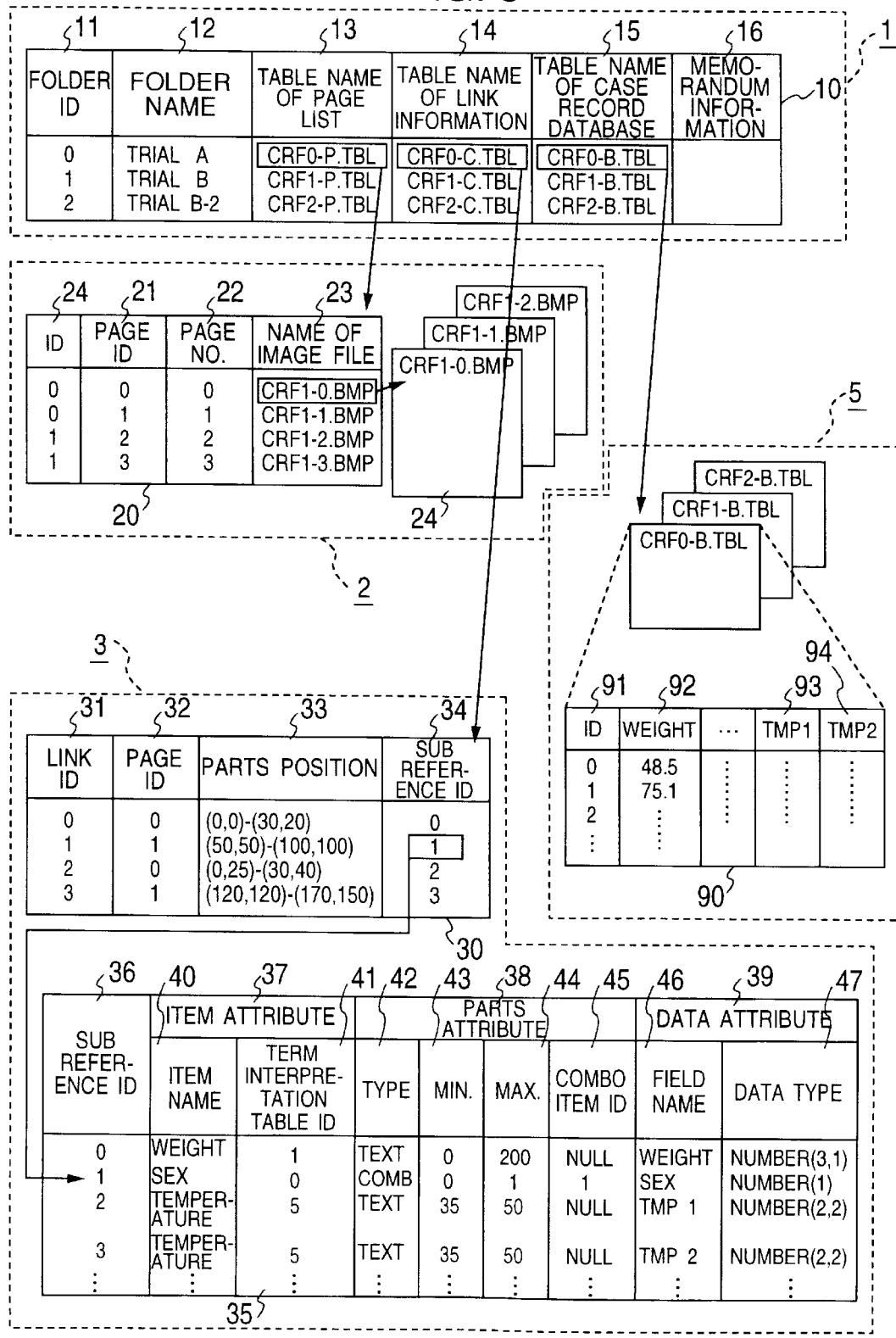
FIG. 3 shows the chart of table contents of folder information 1, image information 2, link information 3 and case record database 5.
Figure 5:
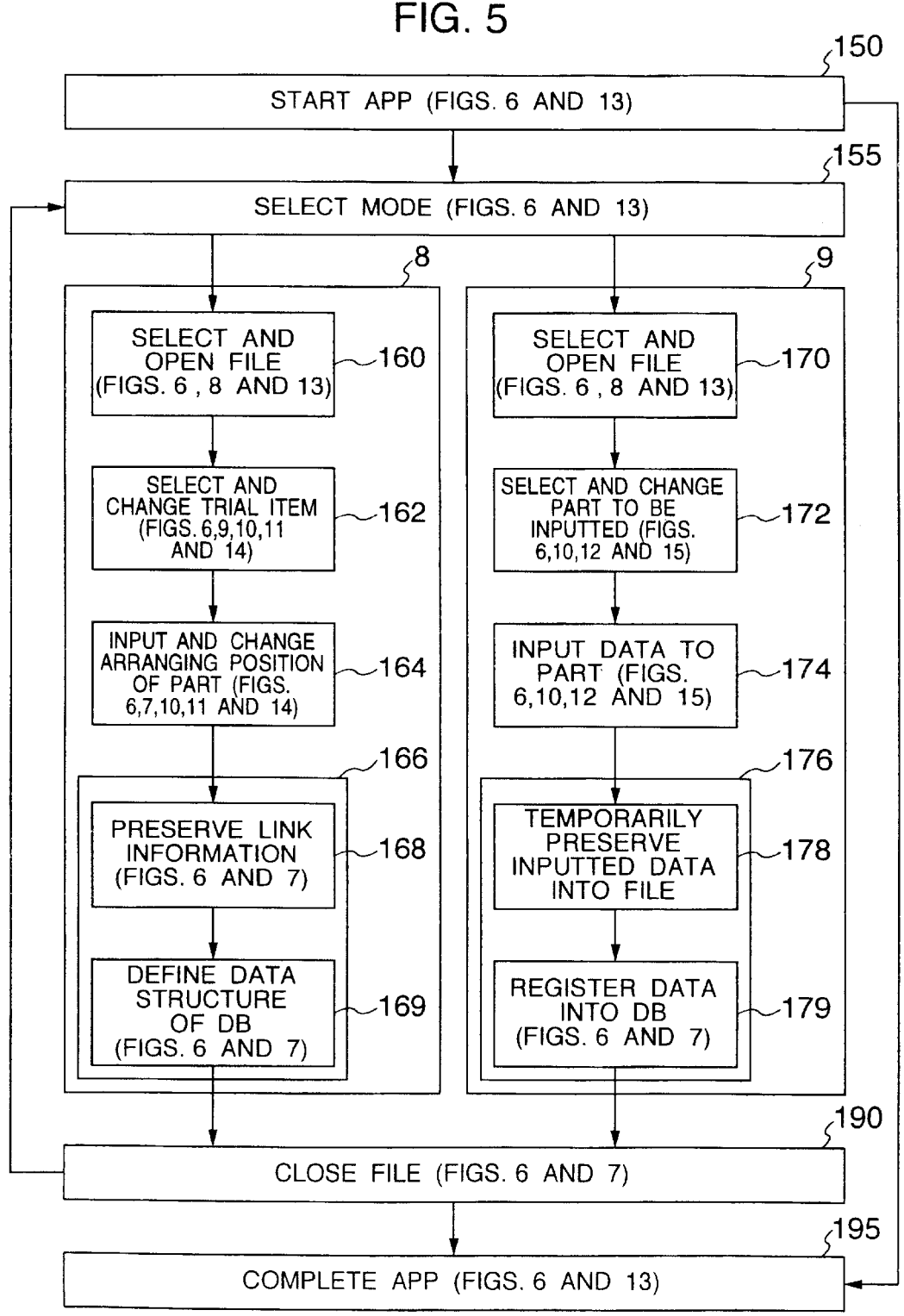
FIG. 5 is a diagram showing the flow of user's works in an embodiment of the present invention.
Figure 6:
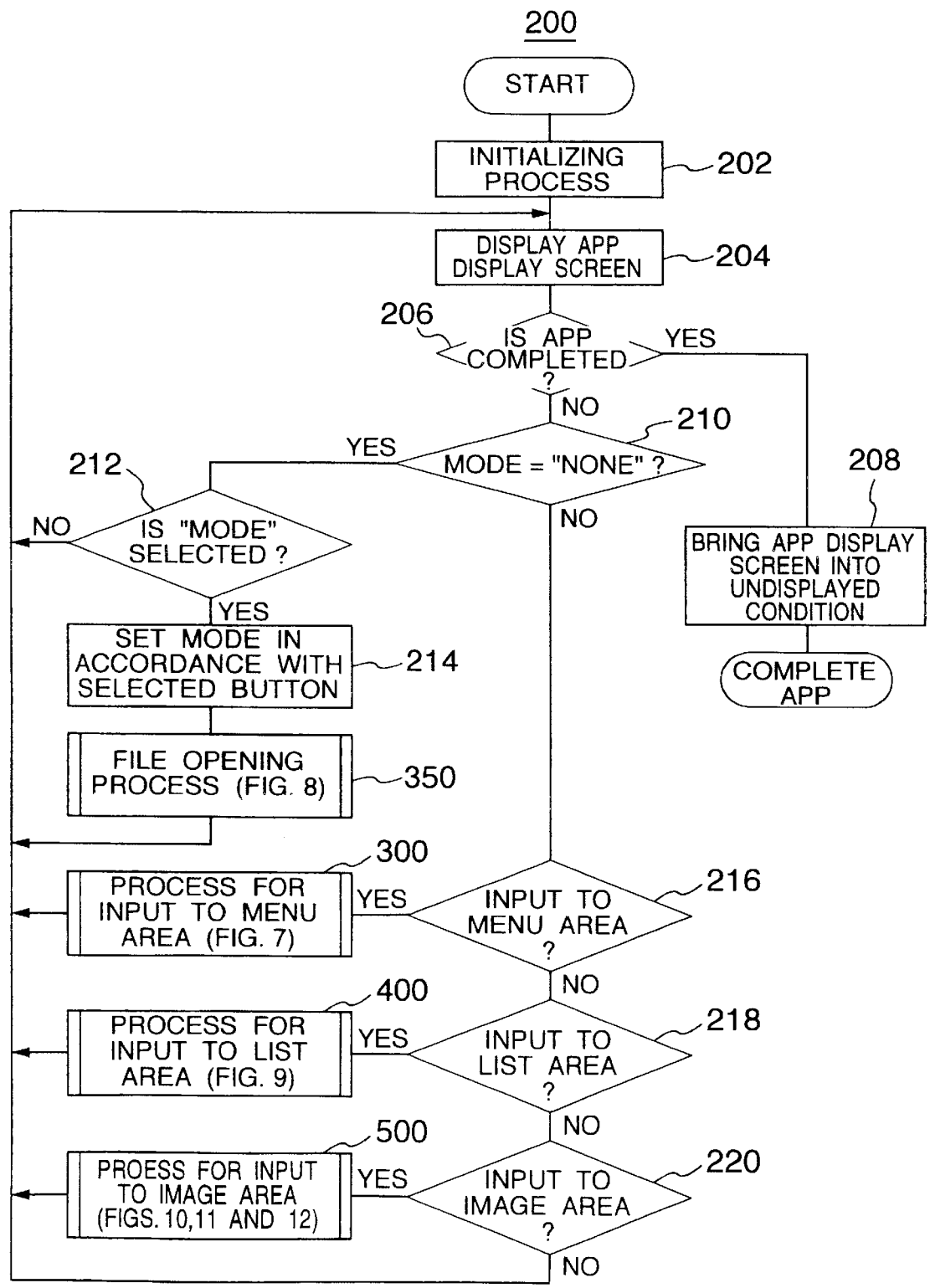
FIG. 6 shows a main flow chart in an embodiment of the present invention.
Figure 7:
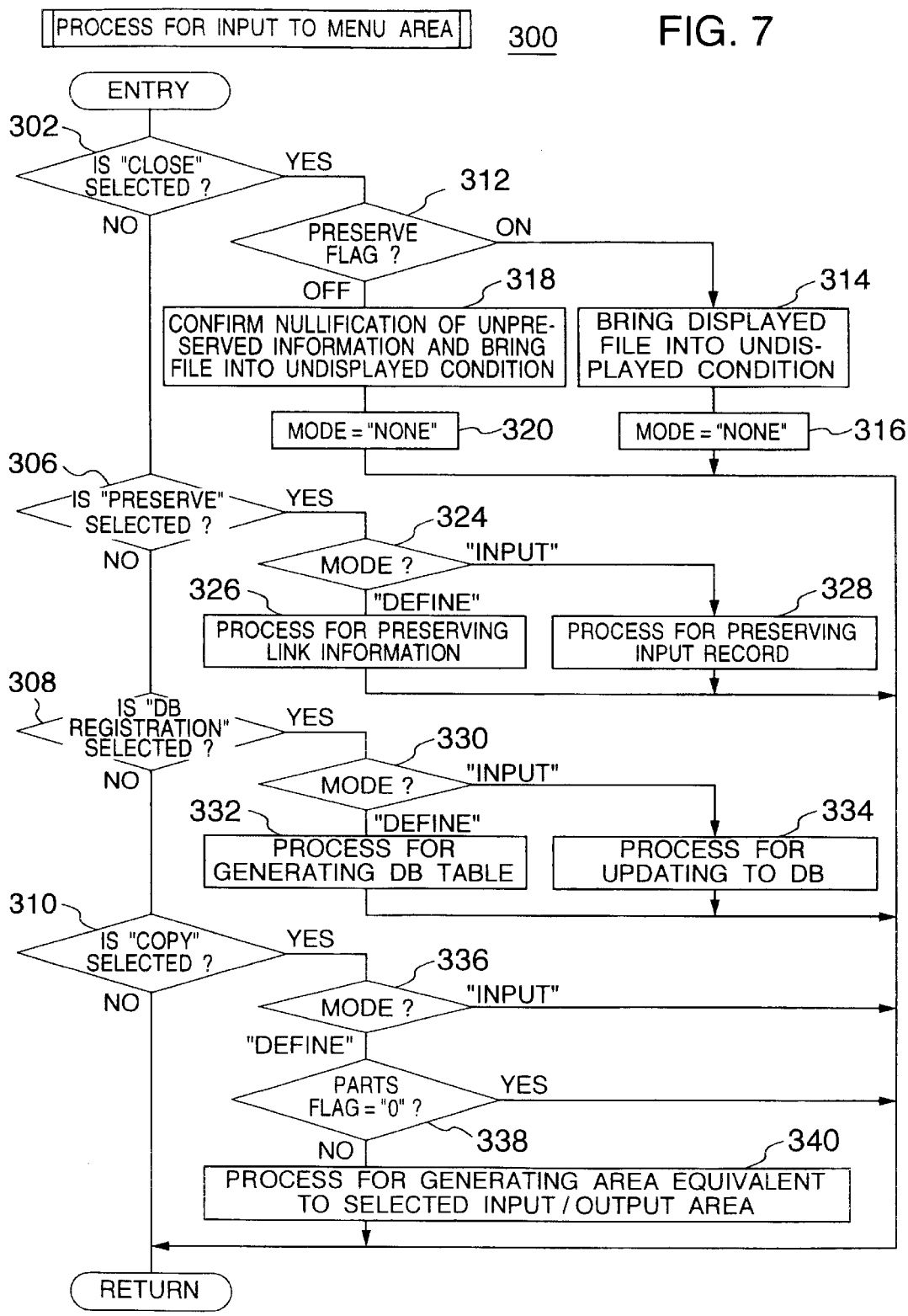
FIG. 7 shows the flow chart of a process for input to a menu area.
Figure 8A:
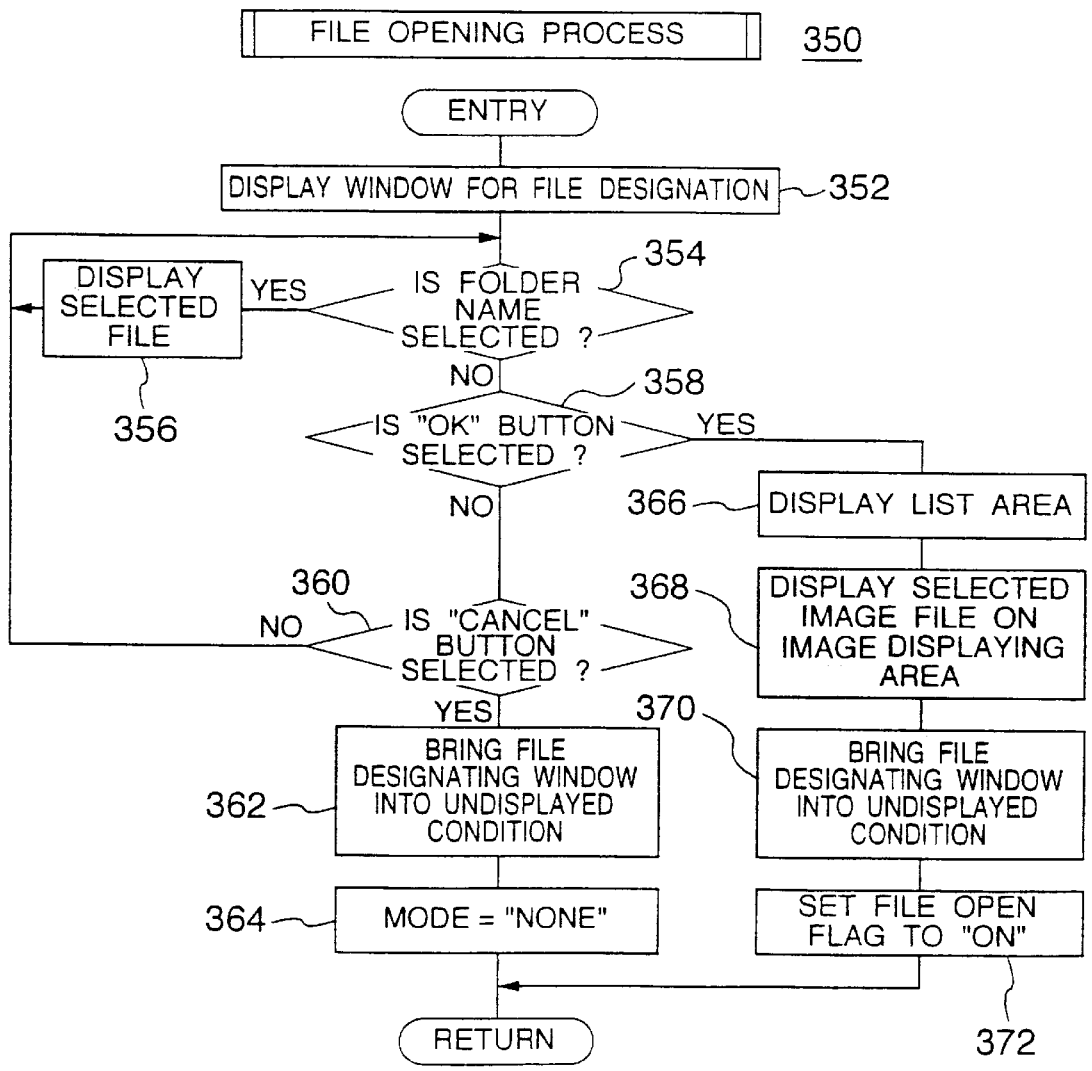
FIGS. 8A and 8B show the flow charts of a file opening process in the case where a database is defined.
Figure 8B:
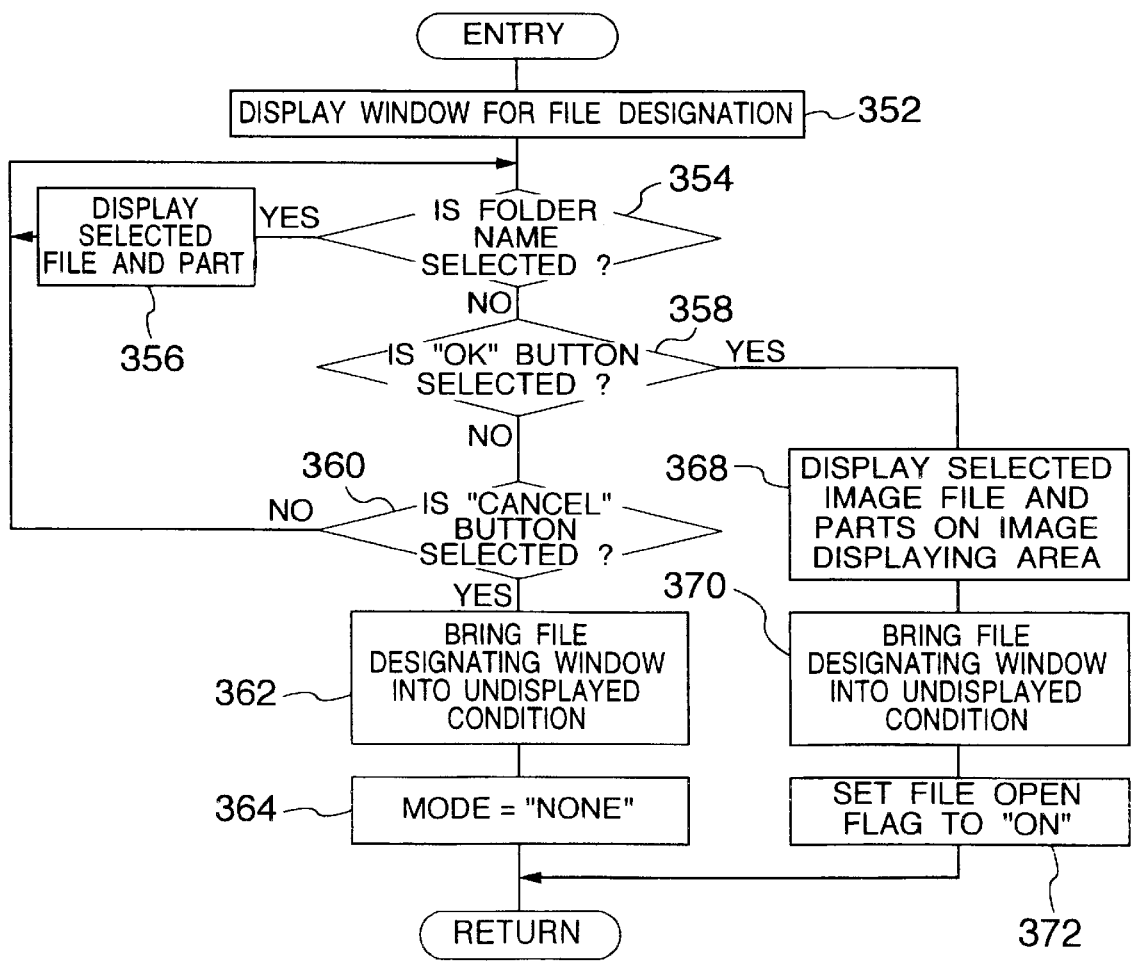
Figure 9:
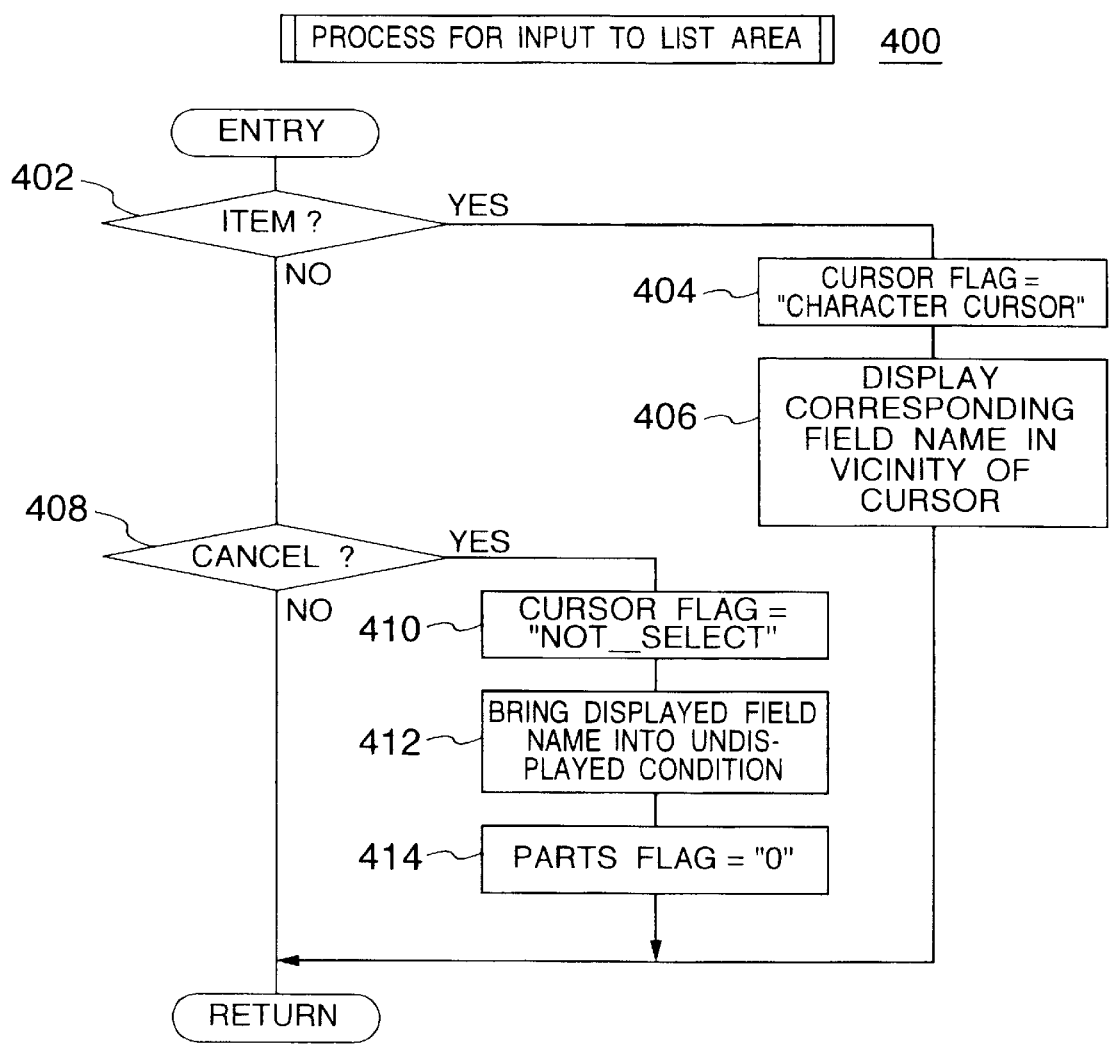
FIG. 9 shows the flow chart of a process for input to a list area.
Figure 10:
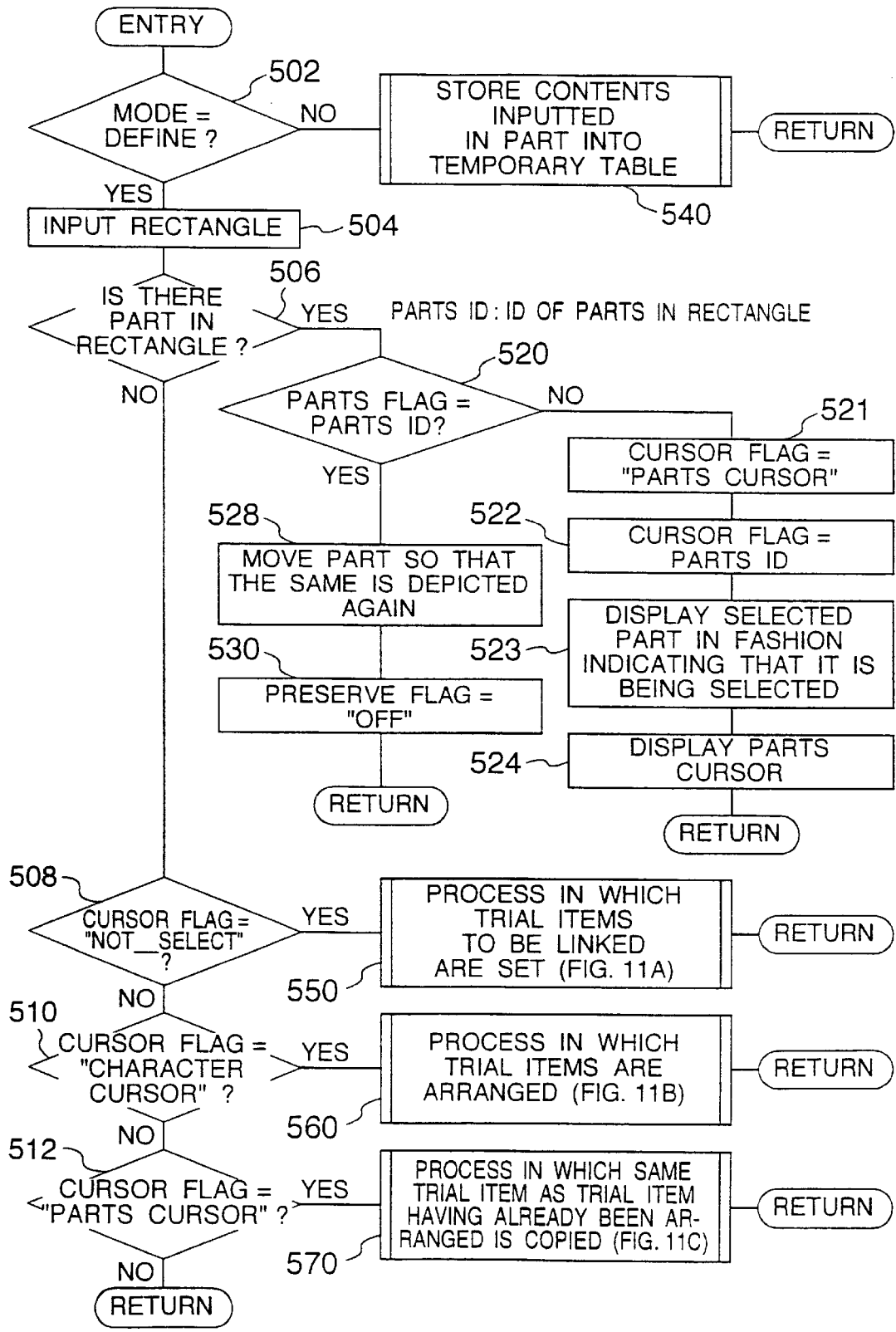
FIG. 10 shows the flow chart of a process for input to an image area.
Figure 11C:
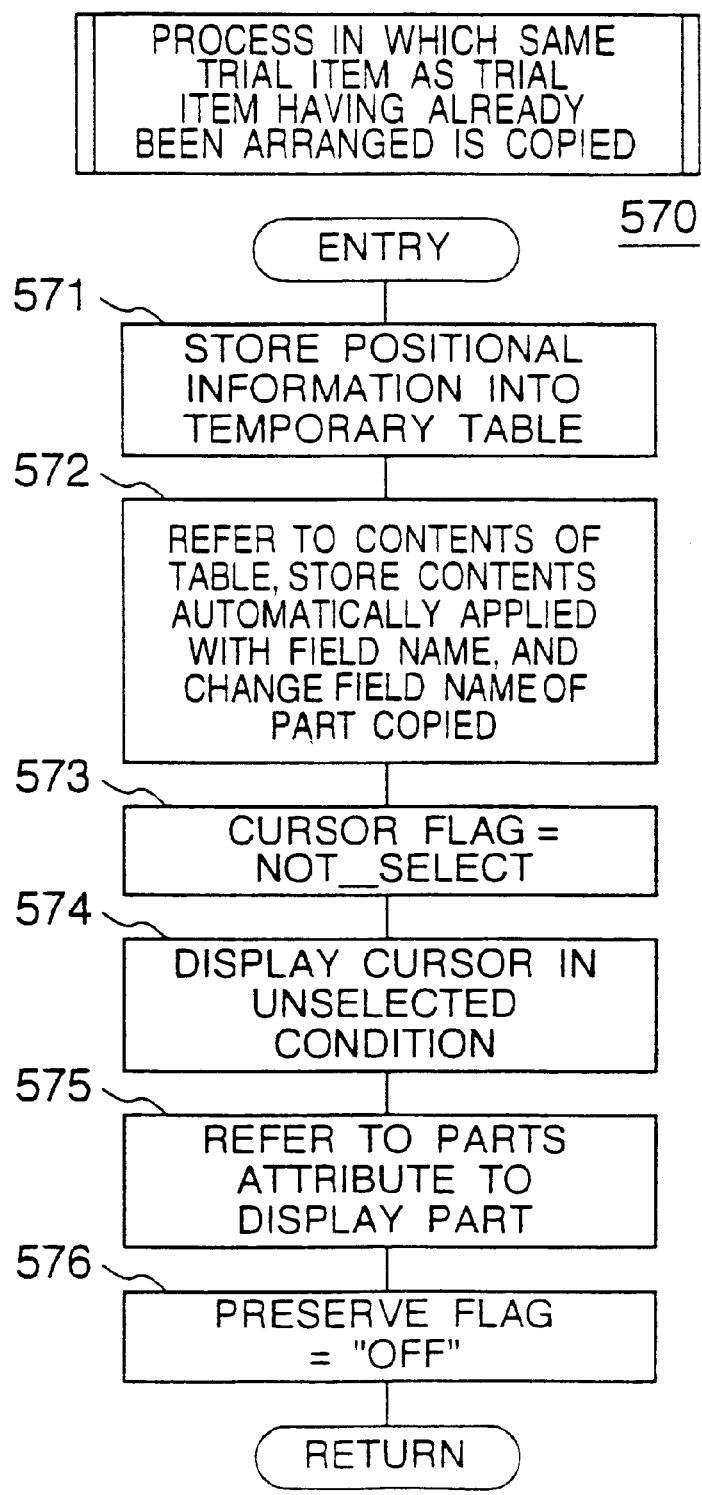
Figure 12:
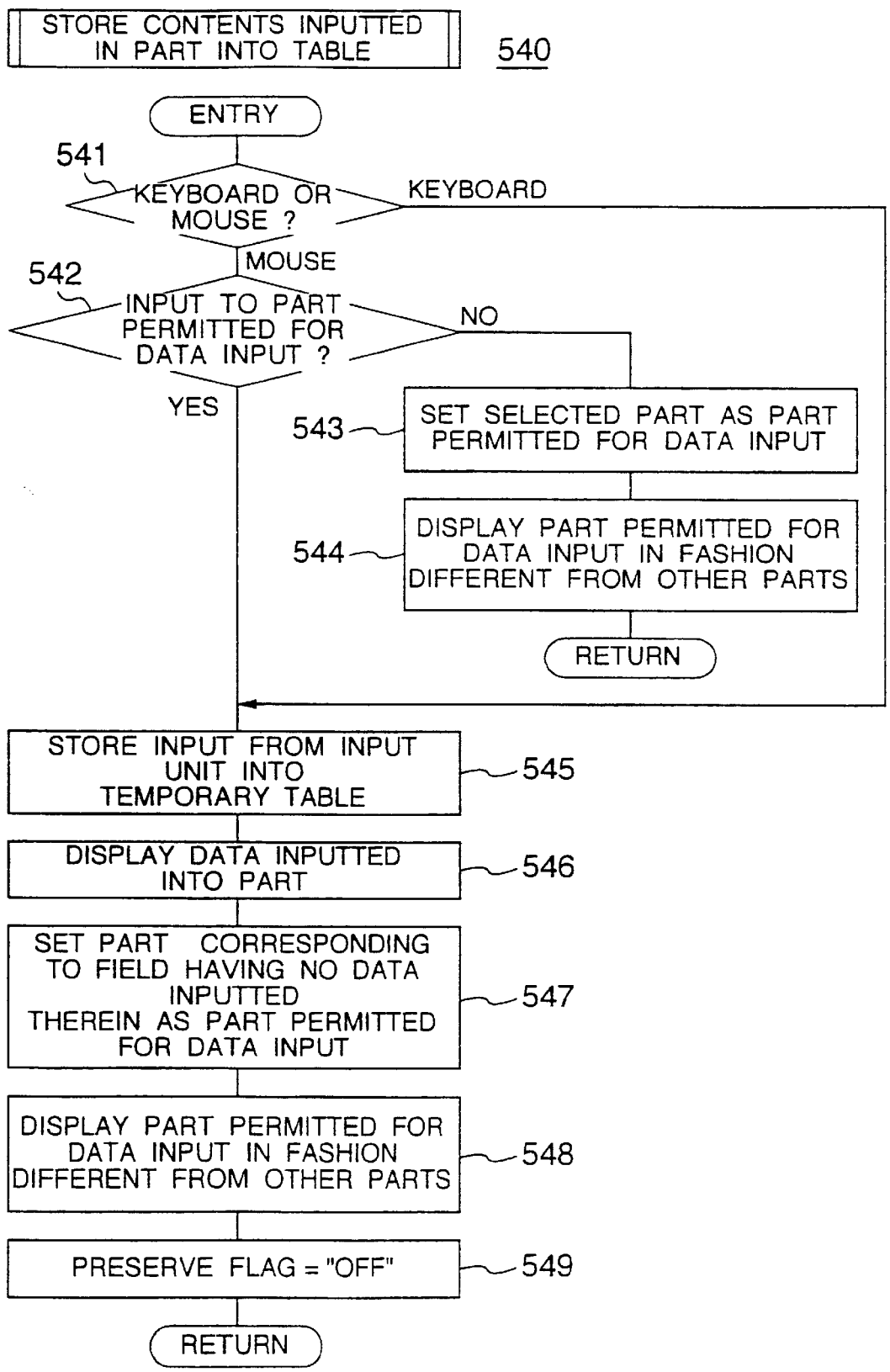

FIG. 1 is a conceptual diagram showing a relationship between processes and data in an embodiment of the present invention. FIG. 2 is a diagram showing the construction of a system. FIG. 3 shows an example of the chart of table contents of folder information 1, image information 2 and link information 3 (which will be described later) and the chart of table contents of a table defined in a case record database 5. FIG. 4 shows the chart of table contents of referential information 4 created beforehand for defining the case record database 5. FIG. 5 shows the flow of user's works in the case where the present embodiment is used. FIG. 6 shows a main flow chart in the present embodiment when a database is created. FIG. 7 shows the flow chart of a process for input to a menu area (which will be described later) FIGS. 8A and 8B show the flow charts of a file opening process. FIG. 9 shows the flow chart of a process in the case where there is an input to a list area (which will be described later). FIGS. 10 to 12 show the flow charts of processes in the case where there is an input to an image area (which will be described later). FIGS. 13 to 15 show examples of display screens.

The database creating process of the present embodiment is generally divided into a process for defining a database and a process for inputting data to the database. In the present embodiment, since there are many processings common to the two processes, those processes are consolidated as a module for creating the database. In the following, the module for creating the database will be explained in accordance with procedures for structuring a case record database.

The outline for creation of a database will now be explained using FIG. 1

In a process 200 for creating a database, a process 8 for defining the database or a process 9 for inputting data to the database is performed in accordance with an input from a user after an initializing process. Since the database inputting process 9 uses link information 3 and a case record database 5 generated in the database defining process 8, the database defining process 8 will first be explained.

In the database defining process 8, the reference is made to image information 2 and referential information 4 to generate an input display screen for inputting data to a database, and a case record database 5 for storing data is defined. Information obtained as the result of generation of the input display screen is link information 3.

The image information 2 is image data obtained from an unfilled CRF blank (or a CRF blank in which the results of clinical trial are not entered) through a process 6 for inputting image information beforehand. The image information 2 is stored in a storage device 103 shown in FIG. 2. The CRF blank is created for each investigative product and is composed of a plurality of sheets for one kind of investigative product. In the present embodiment, folder information 1 is created as information for managing the investigative product to which the CRF corresponds. The details of the folder information 1 will be described later by use of a chart of table contents shown in FIG. 3.

With the provision of such folder information 1, it is possible to extract a desired CRF image file by designating the name of an investigative product even in the case where one sheet of CRF blank is taken in as one image file.

The referential information 4 is prepared through a process 7 for preparing and maintaining referential information beforehand and is stored in the storage device 103 shown in FIG. 2. The referential information 4 is referential data for managing a list of possible items which may provide trial items of a CRF. An item necessary as the trial item of each CRF is included in the referential information. Namely, the trial item of each CRF is given as a subset of referential information. The details will be described later by use of FIG. 4. Also, the referential information is stored in a storage medium such as a CD-ROM and is referred to by use of a CD-ROM driver 108 shown in FIG. 2, as required.

The link information 3 includes the trial item (or representative item name) prescribed for each CRF, the position of an input/output area (hereinafter called part) arranged on a CRF image, and information (such as field name of table, data type, and so forth) necessary for defining and searching a table of a database to be created. The link information 3 is composed of values obtained by referring to the referential information 4 or values inputted from a user.

The database 5 is defined through the database defining process 8 on the basis of the field name of the table and data type included in the link information 3. Therefore, the database defined in the process 8 is only a schema in which the results obtained by a clinical trial are not yet stored.

Next, the database inputting process 9 will be explained. In the database inputting process 9, a data input display screen is displayed on the basis of the image information 2 and the link information 3. By use of the displayed screen, the results of the clinical trial inputted by the user are stored into the database 5 created in the database defining process 8. The image information referred to at this time may be an unfilled CRF blank or may use a CRF blank filled with the results of the trial. Thus, the case record database 5 having the results of the trial stored therein is created through the database inputting process 9.

The construction of the system in the present embodiment will be explained using FIG. 2. The system of the present embodiment includes at least one database defining terminal 100 and at least one database inputting terminal 110 which are connected through a LAN (Local Area Network) 121 or a WAN (Wide Area Network) 122. Also, a facsimile terminal equipment 120 may be used as an input device for taking in the image of a CRF blank. The defining terminal 100 (or the inputting terminal 110) has a central processing unit 101 (or 111) to which a display device 102 (or 112), a storage device 103 (or 113), a keyboard 104 (or 114), a mouse 105 (or 115), an image input device 106 (or 116), a storage medium driver 107 (or 117) and a CD-ROM driver 108 (or 118) are connected. A handwriting input device may be used in lieu of the keyboard or the mouse. Also, the definition and input of the database may be performed by one terminal 100 or 110.

In the case where the defining terminal 100 and the inputting terminal 110 are separately provided, a database creating program may be not one program as shown in FIG. 1, but separate programs for the database defining process 8 and the database inputting process 9.

With the use of the facsimile terminal equipment, the image of a CRF blank filled with data to be stored in the database can be acquired even from a place where the inputting terminal or the defining terminal is not provided. Therefore, the filled CRF blanks can be acquired from more places.

FIG. 3 shows the charts of table contents of folder information 1, image information 2 and link information 3, the charts of table contents of tables defined in the case record database 5, and a relationship between the tables.

A table 10 represents the construction of the folder information 1. The folder information 1 includes information representing a correspondence between CRFs and trials. The table 10 has cells for folder ID 11, folder name 12, table name of page list 13, table name of link information 14, table name of case record database 15 and memorandum information 16. The folder ID 11 is a number for uniquely distinguishing a folder name. The folder name 12 indicates the name of a trial and is used when a user distinguishes the CRF. This folder name is displayed in a file opening process 350 which will be described later. The cell 13 for table name of page list stores the table name of a table 20 for referring to the file name of a file in which the image information of a CRF blank concerning each trial is stored. The table 20 will also be described later. The cell 14 for table name of link information stores the table name of a table 30 in which link information is stored. The cell 15 for table name of case record database stores a table name for uniquely managing a table defined in the case record database 5. The cell 16 for memorandum information stores auxiliary information concerning a trial, the distinction of which is difficult by mere use of the folder name.

Next, explanation will be made of the image information 2. One sheet of CRF blank is stored as one image file and the table 10 is used for managing a plurality of image files. Page ID 21 uniquely distinguishes each page. Page No. 22 indicates the sequence of image files. A cell 23 for name of image file stores the name of the image file in which the CRF image is stored. A cell 24 for ID stores a unique ID for each trial subject in order to indicate the trial subject to which the read CRF image corresponds. In the case where the image of an unfilled CRF is stored, the value of ID 24 is "0". Since the size of the image is not fixed, the storage as separate files as shown in FIG. 3 is convenient for management.

Next, explanation will be made of the link information 3. The link information 3 includes a link information table 30 in which a list of parts forming a CRF image are stored, and a detail table 35 in which detail information concerning a sub reference of each part is stored. The tables 30 and 35 may be constructed by one table. The table 30 has cells for link ID 31, page ID 32, parts position 33 and sub reference ID 34. The link ID is a number for uniquely managing a "part" which will be described later. The part is an input/output area on a display screen for inputting data to the database. The input/output area accepts an input from the input device such as a keyboard, mouse or the like and displays the inputted contents. The page ID 32 indicates the value of the page ID 21 of the table 20. The combination of values stored in the cell 32 for page ID and the cell 33 for parts position can determine a specified area of the image information uniquely. The sub reference ID 34 indicates a sub reference ID 36 of the detail table 35. The detail table 35 has detail information stored concerning parts and is composed of sub reference ID 36, item attribute 37, parts attribute 38 and data attribute 39. Such information is stored through the database defining process 8 on the basis of the referential information 4.

The item attribute 37 includes cells for item name 40 and term interpretation table ID 41. The parts attribute 38 includes cells for parts type 42, minimum 43 of a proper range of data, maximum 44 of the proper range of data, and combo item ID 45. The data attribute 39 includes cells for field name 46 and data type 47. The cell 45 for combo item ID stores a value used when the reference is made to the contents of a table 70 of referential information 4. The contents of each cell will be explained later on together with flow charts.

The next explanation will be made of the case record database table 5. One case record database table is generated for one CRF. An example of the generated table is shown as a table 90. Each field name and data type of the table 90 are defined on the basis of data attribute 39 of the link information 3. ID 91 is an ID for distinguishing a trial subject. A case record for each trial subject is represented as one record of the table 90. A value stored in the cell 91 for ID is obtained referring to the value of ID 24 of the image information 2.

The tables 10 and 20 are generated through the image information inputting process 6. The tables 30 and 35 are generated through the database defining process 8. The table 90 is generated in such a manner that a schema of the table is defined through the database defining process 8, and data in each field is stored through the database inputting process 9.

FIG. 4 shows the charts of table contents of tables forming the referential information 4. Since the cells of a table 60 are similar to those of the above-mentioned detail table 35 of link information 3, the explanation of the name of each cell will be omitted. Representative item name 65 indicates the name of a trial item represented on a CRF blank. In the case where the representative item name is expressed by another item name, the representative item name is translated referring to a term interpretation table 80.

A table 70 is a table for storing detail information concerning parts called combos. The combo part is a part having an input value as one of elective subjects and a combo item is the contents of the elective subject. The table 70 has a cell 74 for combo item ID, a cell 75 for item name, a cell 76 for term interpretation table ID and a cell 77 for next combo item ID. In the case where "COMB" is stored in the cell 67 for parts type of the table 60, the reference is made to cell 74 of the table 70 on the basis of the ID of the combo item ID 71. Thereby, it is determined that the first elective subject is "MALE". Further, reference is made to the combo item ID 74 on the basis of ID value "3" stored in the next combo item ID 77. Thereby, it is determined that the second elective subject is "FEMALE". Since the value of the next combo item ID for the item having the combo item ID of "3" is "END", it is found that there is no subsequent elective subject.

The table 80 associated with the term interpretation table IDs 66 and 76 is an interpretation table for expressing an item name by use of different representations. An example of the table contents of the table 80 is shown in FIG. 4.

In the present embodiment, the system performs a process corresponding to an input from a user. FIG. 5 shows the flow of a user's works. Processes performed by the system in that case will now be explained using flow charts shown in FIGS. 6 to 12.

The user's works include a work for defining the construction of a database and a work for inputting data to the database. In the work for defining the construction of the database, an input display screen for inputting data to the database is generated and a database table for storing data is defined. Namely, a data receptacle is created. On the other hand, in the work for inputting data to the database, the input display screen generated in the database defining work is used to input data to the database table generated in the database defining work.

Portions common to those works include a program starting process 150, a mode setting process 155, a file closing process 190 and a program completing process 195. Thus, the program start and completion (including file close) and the mode setting will be explained using FIG. 6.

When a program is started, the initial values of various flags (which will be described later on) are set in an initializing process (step 202). The set initial values are mode="NONE", file open flag="OFF", preserve flag="ON", parts flag="0", and cursor flag="NOT_SELECT". These flags are internal variables for executing the present program.

After the completion of the initializing process, the present system displays an application program display screen (hereinafter abbreviated to as APP display screen) shown in FIG. 13A on the display device and waits for an input from the user (step 204). The process up to now corresponds to the program starting process 150 shown in FIG. 5.

The APP display screen will be explained using FIG. 13A. The APP display screen 1000 has a menu area 1100 and an image area 1200. The menu area 1100 includes areas 1101 to 1106. It is assumed that by designating one of these areas by use of a pointer (or means controlled by the input device such as mouse for designating and selecting a position or elective item on a display screen), an input for the menu area is made. An input accepted by the system in and after step 204 is either an APP completing process or a mode selecting process until the mode flag is set to a value other than "NONE".

Accordingly, the judgement is made as to whether or not an input is an instruction to complete an application program (hereinafter abbreviated to APP) (step 206). If the APP is completed, the APP display screen is brought into an undisplayed condition (step 208), thereby completing the APP.

On the other hand, if the APP is not completed (step 206), the mode is judged (step 210). In the case where the mode is "NONE", the flow goes to step 212 in which the judgement is made as to whether or not an input is an input for setting the mode. For example, if the input is not an input for the area 1106 ("MODE") shown in FIG. 13A, the flow returns to step 204. On the other hand, if the "MODE" menu 1106 is selected (step 212), judgement is made as to whether a menu further selected by the user (not shown in FIG. 13A) is "DEFINE" or "INPUT" and the mode is set to MODE= "DEFINE" or MODE="INPUT" (step 214). Further, a process 350 for opening a file is performed. After the file opening process is performed, the flow returns to step 204. The file opening process will be described later by use of FIG. 8.

After the setting of the mode, MODE="NONE" is not satisfied in step 210. Therefore, each time there is an input, the system judges whether the input is an input to the menu area, an input to a list area or an input to the image area (steps 216, 218 and 220) and performs a process 300, 400 or 500 corresponding to the result of judgement. In the process 300 for input to the menu area, the process 400 for input to the list area and the process 500 for input to the image area, individual steps are performed in accordance with the combination of mode, flag and user input.

The database defining process 8 will now be explained by use of FIG. 5 in accordance with an input from the user. When the program is started by the user (step 150), step 202 shown in FIG. 6 is performed. This has already been mentioned. Next, when the mode is selected by the user (step 155), step 214 shown in FIG. 6 is performed so that the user opens a file by designating a file name (step 160) during a period of time when a file opening process 350 shown in FIG. 8 is performed.

The file opening process 350 is shown in FIG. 8A.

First, reference is made to the table 10 shown in FIG. 3 to display a window 1300 for file designation shown in FIG. 13A (step 352). At this time, an investigative product name stored in the cell 12 for folder name of the table 10 is displayed on a folder name displaying area 1301. Judgement is made as to whether or not the folder name displayed on the folder name displaying area 1301 is selected (step 354). If the folder name is selected, the flow goes to step 356. If the folder name is not selected, the flow goes to step 358.

In step 356, on the basis of the cell 16 for memorandum information and the cell 13 for table name of page list obtained from the entry of the table 10 concerning the selected folder and also the image file of the first page of the folder extracted from the corresponding table 20, the memorandum information and a reduced image of the image file are displayed on areas 1302 and 1303, respectively.

In step 358, judgement is made as to whether or not an "OK" button 1304 is selected. If the "OK" button is not selected, the flow goes to step 360. If the "OK" button is selected, the flow goes to step 366.

In step 360, judgement is made as to whether or not a "CANCEL" button 1305 is selected. If the "CANCEL" button is not selected, the flow returns to step 354. If the "CANCEL" button is selected, the flow goes to step 362.

In step 362, the file designating window 1300 is brought into an undisplayed condition. In step 364, the mode is set to "NONE", thereby completing the present routine.

On the other hand, in the case where the "OK" button 1304 is selected (step 358), a list displaying area 1400 as shown in FIG. 14A is displayed (step 366) and the image file of the first page of the folder selected referring to the tables 10 and 20 shown in FIG. 3 is displayed on the image displaying area 1200 (step 368). By referring to the table 10, a corresponding table 20 is determined from the folder name selected in step 354. By referring to the table 20, the name of an image file to be displayed is obtained. The image file is structured in the order of page numbers, and an image file having the same page ID is one obtained by reading a CRF having the same structure. An image file having "0" as the value of ID 24 in the table 20 is one obtained by reading an unfilled CRF, and an image file having the ID 24 value other than "0" is one obtained by reading a CRF filled with a case record. The value of the ID 24 corresponds to an ID for distinguishing a trial subject and is used as the ID 91 of the case record database table 90. In step 368, a temporary table having a structure similar to the table concerning the link information 3 explained in conjunction with FIG. 3 is provided on a memory. The temporary table stores parts position, parts attribute, data attribute and so forth which will be designated by the user later on. The file designating window 1300 is brought into an undisplayed condition (step 370) and the file open flag is set to "ON" (step 372), thereby completing the present routine.

FIG. 14A shows an example of the display screen when the file is thus opened. The selected image data is displayed on the image displaying area. The value in the cell 65 for representative item name stored in the table 60 of referential information 4 shown in FIG. 4 is displayed on a representative item name area 1402 of the list displaying area 1400.

For the image area or list area on which the image file is displayed, the user repeats two kinds of processes, mainly including a process for designating a trial item (step 162 in FIG. 5) and a process for designating a location where a part for inputting the result for the trial item is arranged (step 164 in FIG. 5). With the repetition of those processes, data is stored into the temporary table. Though step 164 is performed after step 162 is performed, this sequence may be reversed. Data such as parts arrangement position inputted from the input device by the user is stored into the temporary table (step 166). The preserving process in step 166 includes a process for preserving link information (step 168) and a process for defining the data structure of database (step 169).

After the file opening process 350 is performed, a part is arranged by the user on the basis of an input for the list area or image area to generate a data input display screen. Now, the database defining process 8 will be explained using the flow chart of the process 500 for input to image area shown in FIG. 10, the flow chart of the process 400 for input to list area shown in FIG. 9, and the examples of the display screen shown in FIGS. 14A and 14B.

First, explanation will be made of the process 500 for input to image area for arranging a part on the CRF image. Since the mode is "DEFINE", the flow goes to step 504 through mode judging step 502. A display screen at this time is shown in FIG. 14A.

Figure 14B:
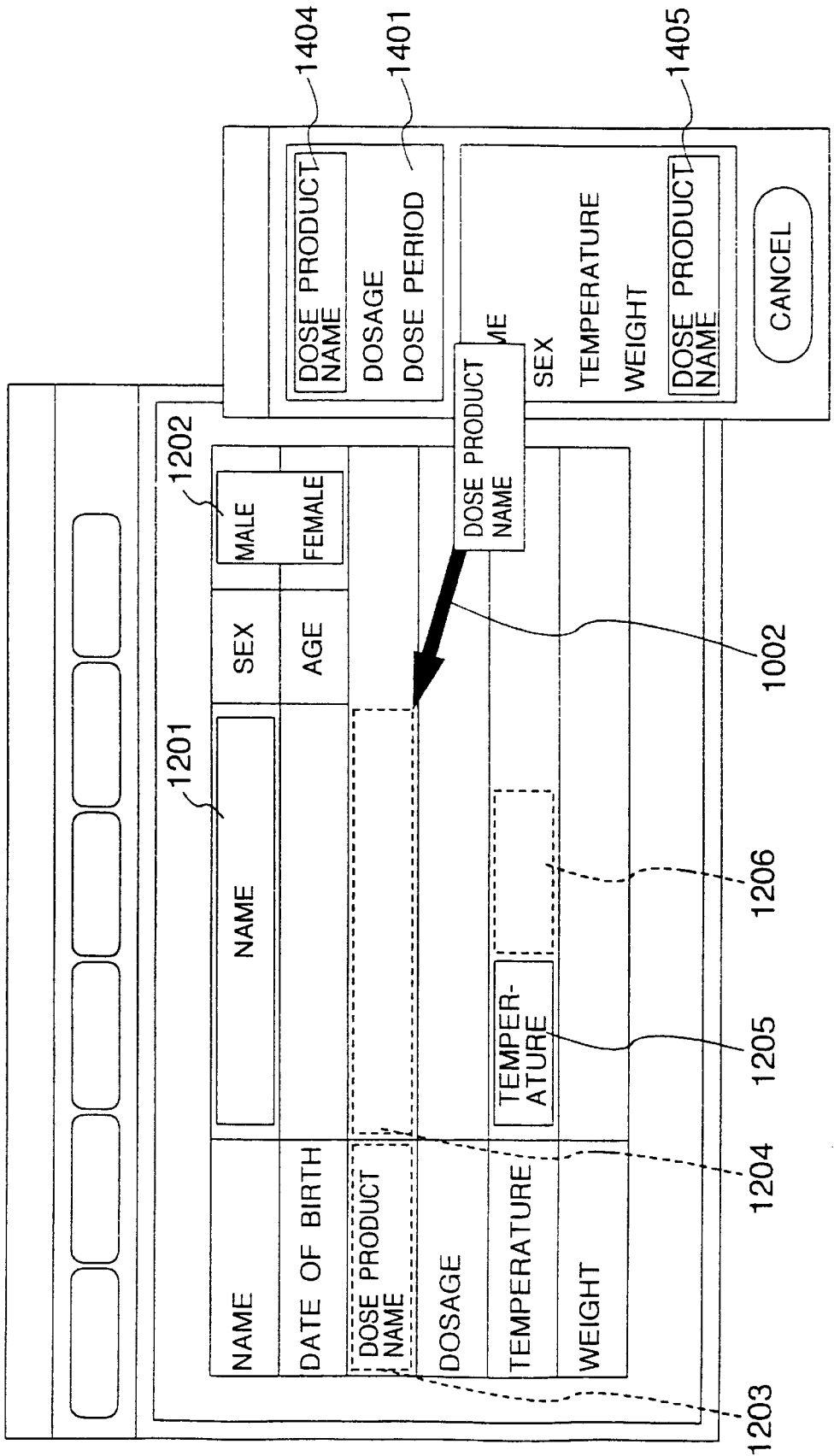

In step 504, an area is designated through a mouse operation by the user. A method for designating the area includes, for example, a method in which two points are designated by a cursor of the mouse to designate a rectangle having the two points on a diagonal. The designation of an area by a menu may be made as a method other than the above method in which the area is designated by inputting a plurality of coordinates by use of the mouse. Without being limited to the rectangle, the form of the area may take a circle, ellipse or any handwritten form or figure. The following explanation will be limited to the designation of a rectangular area. For example, a rectangular area shown by broken line 1203 in FIG. 14B is designated. Thus, the area is reserved on the image.

The inputted area coordinate values and the parts position 33 of the table 30 shown in FIG. 3 are compared to judge whether or not a part used in inputting data to the database is included in the inputted rectangle (step 506). The example of display of a part includes a text part (or an area 1201 in FIG. 14B) for accepting the input of characters and a combo part (or an area 1202 in FIG. 14B) for causing the user to select data from among elective subjects.

As the result of judgement in step 506, the flow proceeds to step 520 if a part is included in the inputted rectangle and step 508 if a part is not included.

Figure 13B:
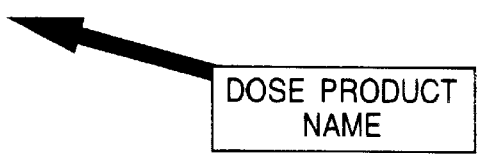
FIG. 13B shows a displayed example of a character cursor.
Figure 13C:
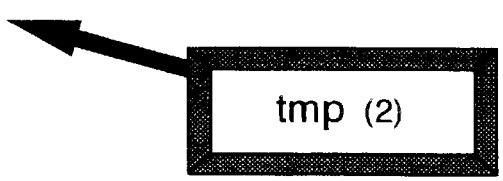
FIG. 13C shows a displayed example of a parts cursor.

Since the result of judgement in step 506 is "No" when a first part is to be arranged, explanation will first be made of the case where the flow proceeds to step 508. In step 508, 510 or 512, a process 550, 560 or 570 is performed referring to the coordinates of the inputted rectangle in accordance with the cursor flag. The cursor flag is a flag for not only causing a process branch but also changing the displayed configuration of a cursor. If the cursor flag is "NOT SELECT", an arrow-shaped cursor 1001 indicating an unselected condition is displayed, as shown in FIG. 14A. If the cursor flag is "CHARACTER CURSOR", there is displayed an arrow-shaped cursor, as shown in FIG. 13B, which has the representation of a trial item in the vicinity of the cursor. If the cursor flag is "PARTS CURSOR", there is displayed an arrow-shaped cursor, as shown in FIG. 13C, which is similar to the character cursor. The parts cursor is of a specific kind of the character cursor or a character cursor which has the same trial item name as a part having already been displayed on the display screen. Namely, a trial item represented by the character cursor has not yet been displayed as a part whereas a trial item represented by the parts cursor has already been displayed as a part.

In the initializing process, the cursor flag is set to "NOT SELECT" and the cursor is therefore a cursor in an unselected condition. When this cursor is inputted to the image area, step 550 is performed as the result of judgement in step 508. In step 550, a trial item is selected. A method for selecting the trial item may include a method for selecting the trial item displayed on the list area with a cursor in an unselected condition. This method will be described later.

The process 550 will be explained using FIG. 11A. In step 551, the image in the area obtained in step 504 is character-recognized. Though the detailed explanation will be omitted, a technique concerning the character recognition of an image has been disclosed by "TURBO Pascal: Practice of Image Processing", pp. 303–320 published on 1989 by Kogaku-sha.

In step 552, the result of recognition in step 551 is compared with the representative item name 65 in the item attribute 62 of the referential information 4. As the result of comparison, a representative item name having the highest degree of matching is selected (step 553) and the cursor flag is set to "CHARACTER CURSOR" (step 554). In step 555, a character string of the representative item name having the highest degree of matching is displayed in the vicinity of the cursor and the first and subsequent items are displayed in the order of matching degree on a candidate item area 1401 of the list area 1400 shown in FIG. 14B. An item 1404 represented by the character cursor is displayed in a fashion different from the other items. Though in FIG. 14B, such an item is displayed with a character string being framed, it may be displayed in an inverted or voided fashion (with white characters surrounded by black background) or may be displayed with a changed color.

In the case where the trial item is thus selected, the cursor is displayed as a character cursor and the cursor flag is turned into "CHARACTER CURSOR". The cursor at this time is displayed as a character cursor, as shown by arrow 1002 in FIG. 14B.

Next, when a rectangular area (1204 shown by a broken line in FIG. 14B) is inputted to the image area, the flow goes from step 510 to the process 560 (FIG. 11B). In the process 560, information concerning the position of the rectangle is obtained from the rectangular area inputted in step 504. This positional information is stored into the temporary table (step 561), and item attribute 62, parts attribute 63 and data attribute 64 extracted from the referential information 4 are stored into the temporary table on the basis of a representative item represented by the character cursor (step 562). At this time, in accordance with a control part, a combo item name is stored into the temporary table with reference made to the table 70 shown in FIG. 4. The above method is such that after a trial item displayed beforehand on the list area is selected or a trial item is obtained as the result of character recognition, an area corresponding to the selected trial item is designated on an image by the cursor. To the contrary, there may be used a method in which an area is reserved on a displayed image and a trial item is associated with the reserved area.

Next, various information is stored into the temporary table and the cursor flag is set to "NOT SELECT" (step 563). A cursor 1001 in an unselected condition as shown in FIG. 14A is displayed (step 564). Further, the reference to the parts attribute 63 is made to display a control part on the basis of the value and positional information stored in the temporary table (step 565). In FIG. 14B, the display down to the second rectangle 1204 is shown. After this rectangle is inputted, a part indicated by reference numeral 1201 or 1205 is displayed on the area 1204. A representative item name is displayed in the part. In step 566, the preserve flag is set to "OFF".

Thus, the control part is arranged. In another trial item selecting method, a trial item displayed on the list area is selected by a cursor in an unselected condition. In the case where there is an input to the list area, a process 400 for input to list area is performed as the result of judgement in step 218 shown in FIG. 6. With reference to FIG. 9 in the process 400, if it is determined as the result of judgement in step 402 that a selected item is a trial item, the flow goes to step 404. In step 404, the cursor flag is set to "CHARACTER CURSOR". In step 406, a representative item name of the selected trial item is displayed in the vicinity of the cursor.

On the other hand, if a "CANCEL" button (1403 in FIG. 14A) on the list area is selected (step 408), the flow goes to step 410 in which the cursor flag is set to "NOT SELECT". The displayed character cursor or parts cursor is displayed again as a cursor in an unselected condition (step 412), and the parts flag is set to "0" (step 414).

In addition to the above methods in which a part is newly arranged, there is the case where a part similar to a part having already been arranged is copied. There are two methods for copying a part. According to a first method, in a state in which a parts cursor is displayed, a rectangle is designated at a location on an image where another part is not included. According to a second method, a parts cursor is first displayed and a "COPY" button 1105 in the menu area 1100 shown in FIG. 13A is thereafter selected.

First, the process 500 for input to image area will be explained by use of FIG. 10 in conjunction with the case where the parts cursor is displayed. Since the parts cursor is a cursor displayed in the case where a part having already been arranged is copied, a precondition is that at least one part has already been arranged on an image.

First, a rectangle is inputted onto an image (step 504) and judgement is made as to whether or not there is a part in the inputted rectangle (step 506). In the case where there is a part in the rectangle, the flow goes to step 520. In step 520, judgement is made to whether or not the parts ID of the part in the rectangle and the parts flag coincide with each other. The flow goes to step 528 if the value of the parts ID and the value of the parts flag coincide and step 521 if both the values do not coincide. In step 528, the part is moved on the basis of input coordinates at the time of input of the rectangle so that the same is depicted again. In step 530, the preserve flag is set to "OFF".

In step 521, on the other hand, the cursor flag is set to "PARTS CURSOR". Next, the parts ID compared in step 520 is set to the cursor flag (step 522). In step 523, the part included in the rectangle is displayed again in a fashion indicating that the same is being selected. In step 524, a cursor is displayed as a parts cursor.

Consider the case where no part is included in the rectangle (step 506). When a rectangle is inputted onto the image area (step 504) after the parts cursor has been displayed, a process 570 is performed if the cursor flag is "PARTS CURSOR". A displayed example of the inputted rectangle is shown by reference numeral 1206 in FIG. 14B.

The process 570 will be explained using FIG. 11C. In step 571, the positional information of the rectangle inputted in step 504 is stored into the temporary table. The reference to item attribute, parts attribute and data attribute of the temporary table concerning the parts ID which is set in the parts flag is made to copy the contents of an item other than the item of the field name. However, a field name, which is different from the field name referred to and indicates that there is a relation with the field name referred to, is applied, for example, by adding a subscript or suffix to the field name, and such a field name is stored into the temporary table. At this time, the field name referred to is also changed into a field name indicating that it was referred to. For example, in the case where a field name in the referential information is "tmp", the field names of the first and second parts are turned to "tmp1" and "tmp2", respectively. In step 573, the cursor flag is set to "NOT SELECT". The cursor is displayed again after the change from the parts cursor to a cursor in an unselected condition (step 574). In step 575, the reference to the parts attribute is made to display a part on the display screen. In step 576, the preserve flag is set to "OFF", thereby completing the process 570.

In this manner, data representing the correspondence between trial items recorded on the CRF blank and the field names of the case record database corresponding thereto can be inputted by the user through the processes 162 and 164 shown in FIG. 5. The inputted data is stored in the temporary table. A process 168 for preserving the data and a process 169 for creating a database will be explained using FIG. 7. In the case where a "PRESERVE" menu 1103 on the menu area 1100 shown in FIG. 13A is selected (step 306 in FIG. 7), the data stored in the temporary table is stored into a file through a process for preserving the link information (step 326 in FIG. 7). Also, in the case where a "DB REGISTRATION" menu 1104 in FIG. 13 is selected (step 308), a database table is generated referring to field names and data types stored in the cells of data attribute 39 of the table 35 (step 332 in FIG. 7).

In the present embodiment, steps 326 and 332 are independently performed in the case where different menus are selected, respectively. However, these steps may be performed one after another in the case where one of the different menus is selected. But, for example, in the case where parts are arranged for a plurality of images, it is preferable that each of steps 326 and 332 can be performed independently. This is because if link information is stored into a file each time it is generated for one image, the table definition of a database for the plurality of images can be performed en bloc. Further, in the case where there is a database structure in which a field cannot be added to a table generated once, the above technique is especially effective.

By closing the file after the storage of the link information and the definition of the database, it becomes possible to perform a database defining process subsequently or a database inputting process. A file closing process (step 190 in FIG. 5) is performed by selecting a "CLOSE" button 1101 on the menu area 1100 shown in FIG. 13A. In the process shown in FIG. 7 in the case where there is an input to the menu area, the flow goes to step 312 in the case where the "CLOSE" button (or menu 1101 in FIG. 13A) is selected (step 302). In step 312, judgement is made as to whether the preserve flag is "ON" or "OFF". If the preserve flag is "ON", the displayed file is changed to an undisplayed condition (step 314) and the mode is set to "NONE" (step 316), thereby completing the present routine. On the other hand, if the preserve flag is "OFF", the user is caused to confirm the nullification of unpreserved information and the file is thereafter changed to an undisplayed condition (step 318). Further, the mode is set to "NONE" (step 320), thereby completing the present routine. When the user does not approve the nullification of unpreserved information, the present routine is completed without performing steps 318 and 320.

The database inputting process 9 is performed after the generation of the link information 3 and the case record database 5 by the data base defining process 8. In the database inputting process 9, a database input display screen is displayed on the basis of the image information 2 and the link information 3, and data inputted to the displayed screen from the user is stored into the case record database 5.

More particularly, as shown in FIG. 5, the user repeats a work of selecting a trial item to be inputted (step 172) and a work of inputting data recorded on the CRF to a selected part (step 174), thereby inputting all data. The inputted data is thereafter preserved (step 176). The preserving process in step 176 includes a process for preserving the inputted data into a file (step 178) and a process for registering the data into the database (step 179).

Since program start (step 150 in FIG. 5) and mode selection (step 155 in FIG. 5) are similar to those in the case of the definition of the database, a repeat explanation thereof will be omitted. When the mode is set to "INPUT" (step 214 in FIG. 6), a process for opening the file (FIG. 8B) is performed subsequent to the setting of the mode. The process for opening the file in the "INPUT" mode is different in only steps 366 and 368 from the process for opening the file in the "DEFINE" mode (FIG. 8A). Accordingly, only those steps will be explained in the following.

In the "INPUT" mode, step 366 is not performed. Namely, the list area is not displayed. In step 368, the reference to tables 10 and 20 is made so that the first page image file of a selected folder is displayed on the image displaying area 1200. Further, the reference is made to the link information 3 on the basis of the table name of link information 14 of the table 10 so that areas for input are displayed as parts on the image. At this time, one of the displayed parts is set such that it is permitted for an input from the keyboard or mouse, and the part permitted for data input is displayed in a fashion different from parts which are not permitted for data input. Also, a temporary table having a data structure similar to that of the table defined in case record database is provided on the memory. At this time, the reference to the table 20 is made to acquire the value of ID 24 from the displayed name of image file and the acquired value is stored into the cell for ID 91' of the temporary table having the similar a data structure similar to that of the table 90. Thereby, a value inputted later for a part can be stored in association with an area on the image file. It is assumed that the image data displayed therein is image data obtained by reading a filled CRF by the image input device. In the case of the image data of an unfilled CRF, the value of ID 24 is "0". Therefore, the value of ID 91' is stored as any value applied by the computer or a value inputted from the input device by the user.

Next, a work of selecting a trial item to be inputted (step 172 in FIG. 5) and a work of inputting data recorded on the CRF to the selected part (step 174 in FIG. 5) will be explained using the flow charts shown in FIGS. 10 and 12 and the examples of the display screen shown in FIGS. 15A and 15B.

In the case where the data recorded on the CRF is inputted, the data is inputted to the image area. Therefore, in step 220 shown in FIG. 6, the flow goes to a process 500 for input to image area. In step 502 shown in FIG. 10, the flow goes to step 540 since the mode is not "DEFINE". The details of step 540 are shown in FIG. 12.

In step 541 shown in FIG. 12, judgement is made as to whether input is by the keyboard or by the mouse. The flow goes to step 542 in the case of an input by the mouse and step 545 in the case of an input by the keyboard. In step 542, judgement is made as to whether or not a position inputted by the mouse is included within a range in which a part permitted for data input is displayed. The flow goes to step 543 if the position is out of the range and step 545 if the position is within the range.

In step 543, a part including the position inputted by the mouse is detected and the detected part is set as a part permitted for data input. The flow goes to step 544. At this time, if the corresponding part is not detected, the process 540 is completed though it is not shown. In step 544, the part permitted for data input is displayed in a fashion different from the other parts, thereby completing the process 540.

On the other hand, in the case where the flow branches from step 541 and step 542, input data from the input device is stored into the temporary table (step 545) and contents inputted to the part are displayed in the part (step 546). After accepting an input indicating the completion of data input (for example, the selection of an "ENTER" key on the keyboard, the release of a button of the mouse, or the like), the temporary table is searched for a field in which no data is inputted and a part corresponding to the searched-out field is set as a part permitted for data input (step 547). The part set as the part permitted for data input is displayed in a fashion different from the other parts (step 548). In step 549, the preserve flag is set to "OFF", thereby completing the process 540.

By repeating the process 540, data entered in the CRF blank is successively stored into the temporary table.

A fashion indicating a part permitted for data input may include a method in which a cursor 1212 indicating the acceptability of the input of characters is displayed as shown in FIG. 15A and a method in which the frame of a part permitted for data input is displayed with a color or form different from those of the other parts.

Also, in the case where an image file obtained by taking in a filled CRF as an image is used as image information to be displayed, an area different from a location having already been subjected to data input is provided as shown in FIG. 15A so that a part to be subjected to data input is displayed, for example, at a position 1210 shifted to the lower portion of the display screen, as shown in FIG. 15B. Thereby, it becomes possible to input data to a part while seeing characters displayed on the image. In this case, when the inputted data is displayed in the part, the part having the displayed data is displayed at a position shown as numeral 1214 of FIG. 15B. Also, a part permitted for data input (1212) and a part corresponding to the field having data inputted therein are displayed on the display screen, as shown in FIG. 15B.

In this manner, the data recorded on the CRF blank is stored into the temporary table through the processes 172 and 174 shown in FIG. 5. A process 178 for preserving the data stored in the temporary table into a file and a process 179 for registering the data into the database will be explained using FIG. 7. The mode is "INPUT". Therefore, in the case where the "PRESERVE" menu 1103 on the menu area 1100 is selected (step 306 in FIG. 7), a process for preserving an input record (step 328 in FIG. 7) is performed so that the input record or the data stored in the temporary table is stored into a file. Also, in the case where the "DB REGISTRATION" menu 1104 is selected (step 308), a process for updating the record to the database (step 334 in FIG. 7) is performed so that the contents of the file are stored into the case record database 5.

Steps 178 and 179 may be performed continuously. However, when the input is made using a plurality of terminals, there may be the case where it is possible to preserve inputted data. This is because if the access to the database is performed each time the inputted data is preserved, another access to the database is impossible. Accordingly, the above-mentioned separation of the process for preserving data inputted from a terminal and the process for registering the data into the database makes it possible to reduce a fear that the inputted data may be lost due to hardware trouble or erroneous manipulation.

In this manner, the data recorded on the CRF blank is stored into the case record database.

Since a method for closing the file is similar to that in the database defining process, the explanation thereof will be omitted. Also, since a method for completing the present system has been explained in conjunction with the start of the system, the repeated explanation thereof will be omitted.

The above program for performing the database creating method according to the present invention is stored in a recording medium such a hard disk, floppy disk, optical disk or the like and is read into a main storage of the CPU so that it is executed.

According to the present invention, it is possible to define the data structure of a database even if information concerning the data structure of the database is not directly inputted. Therefore, the need of a work for distinguishing field names unnecessary in order to input data recorded on a form is eliminated, hereby improving the working efficiency of a case record database creating work.

Also, a positional relationship in a form between cells filled with data to be inputted to a database is held, as it is, as a positional relationship on an input display screen between input areas for inputting the data. Therefore, complexity associated with the input of data is reduced.

A case record database having already been created for a certain CRF can also be used in creating a case record database concerning another CRF including trial items similar to those in the first CRF. Therefore, a time required for creating a case record database is reduced.

According to the present invention, a display screen for inputting data to a database on the basis of an inputted CRF image can be displayed independently of the generation of a table for registering data to the database. Therefore, even if the data input display screen is changed, only the change of link information between data items is required every time or there is no need to define the data structure of the database over again. Accordingly, it is possible to flexibly cope with the change of a CRF blank, thereby reducing a time required for creating a case record database.

With the provision of folder information, even when one sheet of CRF blank is taken in as one image file, a desired CRF image file can be extracted by merely designating the name of an investigative product.

In the case where the defining terminal 100 and the inputting terminal 110 are separately provided, a database creating program may include separate programs for a database defining process and a database inputting process in lieu of one program as shown in FIG. 1. With the use of the separate programs, the storage capacity of a storage device or the memory occupancy of a memory can be reduced, thereby improving the execution speed of the program.

By using a facsimile terminal equipment as an image input device, an image concerning a form filled with data to be inputted to a database can be obtained even from a place where there is no inputting terminal and/or no defining terminal. Therefore, investigation in a wider range can be made, for example, in the case of an opinionnaire or questionnaire totalizing system.

What is claimed is:

1. A database creating method using image information and a computer, comprising the steps of:
   (a) providing referential information in which representative item information concerning an item name represented on a form, parts control information for controlling a part as an input/output area forming a display screen for inputting data to a database, and data attribute information including field name and data type referred to in defining a table in the database are created for each item name beforehand;
   (b) generating, on the basis of an input from a user for image information of the form inputted beforehand, link information which includes positional information for uniquely distinguishing a displaying position of a part on the image information, and sub referential information created on the basis of the referential information for uniquely distinguishing a field of the database by designating said part on the image information;
   (c) displaying a part on the image information displayed on said display device on the basis of the parts control information, the representative item information and the positional information; and
   (d) defining a table in the data on the basis of the data attribute information included in the link information.

2. A database creating method according to claim 1, further comprising the steps of:
   (e) displaying a display screen for input to the database on the basis of the image information inputted beforehand and the link information; and
   (f) storing input data from the input display screen into the table of the database defined in said step (d) on the basis of the parts control information and the data attribute information.

3. A database creating program stored in a computer readable storage medium, the program comprising the steps of:
   (a) providing referential information in which representative item information concerning an item name represented on a form, parts control information for controlling a part as an input/output area forming a display screen for inputting data to a database, and data attribute information including field name and data type referred to in defining a table in the database are created for each item name beforehand;
   (b) generating, on the basis of an input from a user for image information of the form inputted beforehand, link information which includes positional information for uniquely distinguishing a displaying position of a part on the image information and sub referential information created on the basis of the referential information for uniquely distinguishing a field of the database by designating said part on the image information;
   (c) displaying a part on the image information displayed on said display device on the basis of the parts control information, the representative item information and the positional information;
   (d) defining a table in the database on the basis of the data attribute information included in the link information;
   (e) displaying a display screen for input to the database on the basis of the image information inputted beforehand and the link information; and
   (f) storing input data from the input display screen into the table of the database defined in said step (d) on the basis of the parts control information and the data attribute information.

4. A data processing method comprising the steps of:
   (a) displaying an image on a display device on the basis of image data stored in a storage device;
   (b) responding to an instruction for reservation of an area on the displayed image to reserve the area; and
   (c) responding to the input of at least one of the name of said area and input information for said area so that a correspondence relationship between the position of said area on the displayed image and said at least one of the name of said area and the input information for said area are stored into said storage device in association with the image data stored in said storage device.

5. A data processing method according to claim 4, wherein in said step (c), the result of character recognition for a part of the image is stored as the name of said area or the input information for said area.

6. A data processing system comprising:
   a first storage device for storing image data;
   a display device for displaying the stored image data of said first storage device as an image;
   an input device for inputting an instruction for reservation of an area on the image displayed on said display device and at least one of the name of said area and input information for said area; and
   a second storage device for storing, in response to the input of said at least one of the name of said area and input information for said area, a correspondence relationship between the position of said area on the displayed image and said at least one of the name of said area and the input information for said area in association with the image data stored in said first storage device.

7. A data processing system according to claim 6, wherein said first storage device is the same as said second storage device.

8. A computer readable recording medium in which image data is stored in association with the position of an area on a displayed image of the image data and at least one of the name of said area and input information for said area.

9. A computer readable recording medium in which image data is stored in association with the position of an area on a displayed image of the image data and the data type of input information for said area.

10. A computer program executed on a computer to cause the computer to perform a process comprising the steps of:

displaying an image on a display device on the basis of image data stored in a storage device;

responding to an instruction for reservation of an area on the displayed image to reserve the area; and responding to the input of at least one of the name of said area and input information for said area so that a correspondence relationship between the position of said area on the displayed image and said at least one of the name of said area and the input information for said area are stored into said storage device association with the image data stored in said storage device.

11. A method for creating a database using image information and a computer system, comprising the steps of:

(a) inputting referential information storing a correspondence relationship of name and attribute information of data items displayed on said image information and a data field included in said database;

(b) displaying on a display device said image information;

(c) extracting said name and said attribute information of said field of said database on the basis of said referential information by designating a data item on said image information with a position input device, to generate a detail table defining said database;

(d) extracting positional information of an input/output area by designating a data input/output area corresponding to said data item with said position input device;

(e) generating link information in which said detail table is linked with said positional information for each of said data items; and (f) generating a database by reserving a data storage area on the basis of said detail table.

12. A method for creating a database using image information and a computer system, comprising the steps of:

(a) inputting link information in which a detail table is linked with positional information of an input/output area for each of a plurality of data items included in said image information, wherein said detail table is constructed with name and attribute information of a field included in said database, and said field stores a mutual correspondence relationship for said data items;

(b) displaying said image information on a display device in order to input data into said database;

(c) inputting data into said input/output area on said image information by designating said input/output area with a position input device; and (d) storing said inputted data into a field of said database on the basis of said link information, wherein said field corresponds to said data item included in said image information.

* * * * *